US011360517B2

(12) United States Patent
Paek et al.

(10) Patent No.: US 11,360,517 B2
(45) Date of Patent: Jun. 14, 2022

(54) FLEXIBLE DISPLAY APPARATUS

(71) Applicant: LG Display Co., Ltd., Seoul (KR)

(72) Inventors: SeungHan Paek, Paju-si (KR);
Seongwoo Park, Paju-si (KR); SeJune Kim, Paju-si (KR); Joonsuk Lee, Paju-si (KR); Saemleenuri Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/454,443

(22) Filed: Jun. 27, 2019

(65) Prior Publication Data
US 2020/0004295 A1 Jan. 2, 2020

(30) Foreign Application Priority Data

Jun. 29, 2018 (KR) .................. 10-2018-0075161
Dec. 26, 2018 (KR) .................. 10-2018-0169924

(51) Int. Cl.
*G06F 1/16* (2006.01)
(52) U.S. Cl.
CPC .......... *G06F 1/1652* (2013.01); *G06F 1/1641* (2013.01)
(58) Field of Classification Search
None
See application file for complete search history.

(56) References Cited

U.S. PATENT DOCUMENTS

| 10,014,352 | B1* | 7/2018 | Tsai .................... H01L 51/0097 |
| 2013/0194761 | A1* | 8/2013 | Kim ..................... G06F 1/1652 361/749 |
| 2016/0093644 | A1 | 3/2016 | Ki et al. |
| 2016/0099433 | A1* | 4/2016 | Prushinskiy ........ H01L 51/5253 257/40 |
| 2016/0179229 | A1 | 6/2016 | Ahn et al. |
| 2016/0209874 | A1 | 7/2016 | Choi et al. |

(Continued)

FOREIGN PATENT DOCUMENTS

| CN | 204117507 U | 1/2015 |
| CN | 105009188 A | 10/2015 |

(Continued)

OTHER PUBLICATIONS

First Notification of Office Action dated Mar. 25, 2021, issued in corresponding Chinese Patent Application No. 201910572320.7.

(Continued)

*Primary Examiner* — Christopher R Lamb
(74) *Attorney, Agent, or Firm* — Morgan, Lewis & Bockius LLP

(57) ABSTRACT

Disclosed is a flexible display apparatus with enhanced reliability. The flexible substrate includes a plurality of display areas and a bending area between the plurality of display areas, a display unit provided in in the plurality of display areas and the bending area of the flexible substrate, a cover film covering the display unit, and a supporting member including a plurality of supporting parts respectively supporting the plurality of display areas and an elastic portion supporting the bending area. The plurality of supporting parts and the elastic portion include different materials, and a boundary surface between each of the plurality of supporting parts and the elastic portion has a concave curved shape or a shape inclined at a certain angle.

23 Claims, 14 Drawing Sheets

(56) References Cited

U.S. PATENT DOCUMENTS

| | | |
|---|---|---|
| 2016/0270210 A1* | 9/2016 | Shin .................. H05K 5/0017 |
| 2017/0373121 A1* | 12/2017 | Leng .................. H01L 27/32 |
| 2018/0011576 A1 | 1/2018 | Ryu |
| 2018/0046220 A1* | 2/2018 | Kim .................. H01L 51/0097 |
| 2018/0081399 A1 | 3/2018 | Kwon et al. |
| 2018/0097197 A1 | 4/2018 | Han et al. |
| 2018/0104915 A1 | 4/2018 | Liu |
| 2018/0160553 A1 | 6/2018 | Yeh et al. |
| 2018/0182829 A1 | 6/2018 | Shin et al. |
| 2019/0207130 A1 | 7/2019 | He et al. |
| 2019/0237689 A1 | 8/2019 | Liu et al. |

FOREIGN PATENT DOCUMENTS

| | | |
|---|---|---|
| CN | 105702624 A | 6/2016 |
| CN | 106328599 A | 1/2017 |
| CN | 106716642 A | 5/2017 |
| CN | 106782088 A | 5/2017 |
| CN | 106910823 A | 6/2017 |
| CN | 206400960 U | 8/2017 |
| CN | 107591088 A | 1/2018 |
| CN | 107871451 A | 4/2018 |
| CN | 107886846 A | 4/2018 |
| CN | 107978626 A | 5/2018 |
| CN | 108155218 A | 6/2018 |
| CN | 108198842 A | 6/2018 |
| EP | 2951808 B1 | 1/2020 |

OTHER PUBLICATIONS

Decision of Rejection dated Jan. 6, 2022, issued in corresponding Chinese Patent Application No. 201910572320.7.

Second Notification of Office Action dated Oct. 9, 2021, issued in corresponding Chinese Patent Application No. 201910572320.7.

* cited by examiner

FLEXIBLE DISPLAY APPARATUS

CROSS-REFERENCE TO RELATED APPLICATIONS

This application claims the benefit of and priority to Korean Patent Application No. 10-2018-0075161, filed on Jun. 29, 2018, and Korean Patent Application No. 10-2018-0169924, filed on Dec. 26, 2018, each of which is hereby incorporated by reference in its entirety as if fully set forth herein.

BACKGROUND

Technical Field

The present disclosure relates to a flexible display apparatus.

Discussion of the Related Art

Generally, display apparatuses are being widely used as a display screen of each of various electronic devices such as mobile communication terminals, electronic organizers, e-books, portable multimedia players (PMPs), navigation devices, ultra mobile personal computers (UMPCs), mobile phones, smartphones, tablet personal computers, watch phones, electronic pads, wearable devices, portable information devices, automotive control display apparatuses, televisions, notebook computers, monitors, etc.

In display apparatuses, liquid crystal display (LCD) apparatuses, light emitting display apparatuses, and electrophoresis display apparatuses may be thinned, and thus, research and development for implementing the display apparatuses as flexible display apparatuses are being done. In the flexible display apparatuses, lines and a display unit including a thin film transistor (TFT) are provided on a flexible substrate having flexibility, and even when being bent like paper, an image may be displayed. Accordingly, the flexible display apparatuses may be applied to various display fields.

Recently, rollable display apparatuses or foldable display apparatuses each using advantages of flexible display apparatuses capable of being bent or folded may provide a large screen of a display unit while maintaining portable convenience, and thus, are attracting much attention as next-generation display apparatuses.

SUMMARY

Accordingly, embodiments of the present disclosure are directed to a flexible display apparatus that substantially obviates one or more of the problems due to limitations and disadvantages of the related art.

The inventors have recognized that, in a case where a flexible display panel is manufactured by forming a flexible substrate on carrier glass, completing a process of manufacturing the flexible display panel, and detaching (or separating) the carrier glass from the flexible substrate through a release process using a laser beam, the manufacturing cost increases due to using an expensive laser apparatus and a defect (particles or transfer caused by a surface roughness of a flexible substrate) occurs due to a laser release process. Also, the inventors have recognized that, since a rear protection film (or a back plate) is attached on a rear surface of the flexible substrate, the bending reliability of the flexible display panel is reduced due to a bending stress applied to a bending area of the flexible display panel by the rear protection film. Therefore, the inventors have continuously researched and developed technology for replacing the laser release process and have researched technology for securing the bending reliability of the flexible display panel through a manufacturing process without the laser release process, and thus, have invented a flexible display apparatus having a new structure with enhanced reliability.

An aspect of the present disclosure is directed to providing a flexible display apparatus with enhanced reliability.

The objects of the present disclosure are not limited to the aforesaid, but other objects not described herein will be clearly understood by those skilled in the art from descriptions below.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a flexible display apparatus comprises a flexible substrate including a plurality of display areas and a bending area between the plurality of display areas, a display unit provided in in the plurality of display areas and the bending area of the flexible substrate, a cover film covering the display unit, and a supporting member including a plurality of supporting parts respectively supporting the plurality of display areas and an elastic portion supporting the bending area, wherein the plurality of supporting parts and the elastic portion include different materials, and a boundary surface between each of the plurality of supporting parts and the elastic portion has a concave curved shape or a shape inclined at a certain angle.

In another aspect, a flexible display apparatus comprises a flexible substrate including a plurality of display areas and a bending area between the plurality of display areas, a display unit provided in in the plurality of display areas and the bending area of the flexible substrate, a cover film covering the display unit, and a glass substrate including an open portion disposed on a rear surface of the flexible substrate to overlap the bending area, wherein the open portion includes an inclined surface having a curved shape.

The flexible display apparatus according to the present disclosure may be manufactured even without a laser release process and may enhance bending reliability and reliability for preventing penetration of water or oxygen.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION

Figure 1:
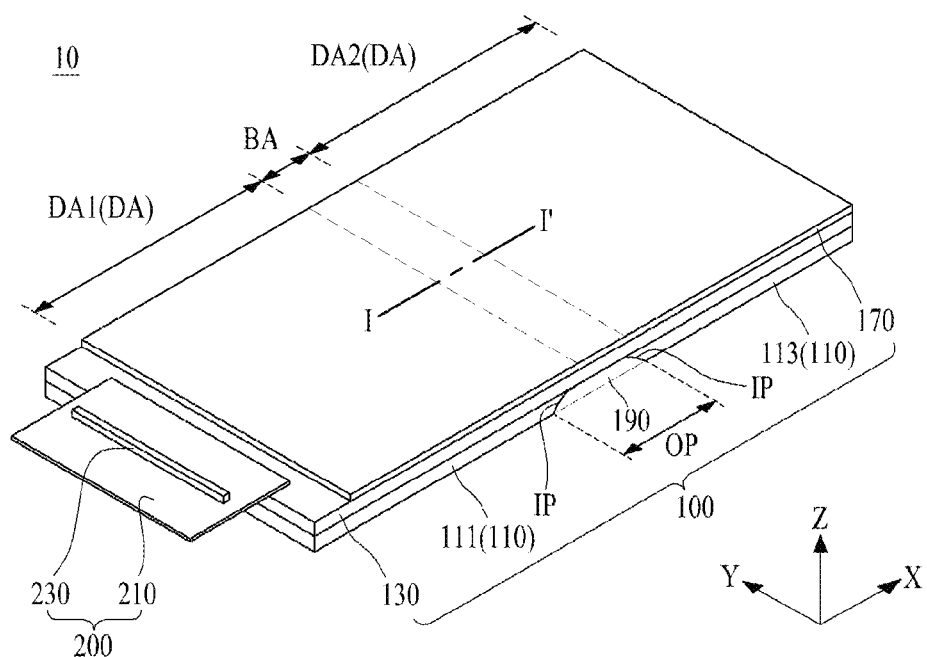
FIG. 1 is a perspective view illustrating a flexible display apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

Figure 2:
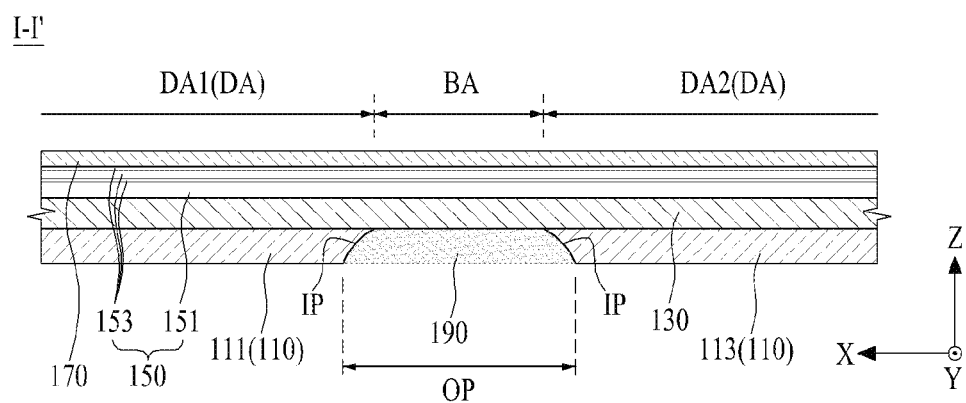
FIG. 2 is a cross-sectional view taken along line I-I' illustrated in FIG. 1.

FIG. 1 is a perspective view illustrating a flexible display apparatus 10 according to an embodiment of the present disclosure, and FIG. 2 is a cross-sectional view taken along line I-I' illustrated in FIG. 1.

Referring to FIGS. 1 and 2, the flexible display apparatus 10 according to an embodiment of the present disclosure may include a flexible display panel 100 and a panel driving circuit 200.

The flexible display panel 100 may be a flexible light emitting display panel, a flexible organic light emitting display panel, a flexible liquid crystal display panel, a flexible electrophoresis display panel, a flexible electrowetting display panel, a flexible micro light emitting diode display panel, or a flexible quantum dot light emitting display panel. Hereinafter, an example where the flexible display panel 100 is a flexible organic light emitting display panel will be described in detail.

The flexible display panel 100 according to the present disclosure may include a plurality of display areas DA and a bending area BA between the plurality of display areas DA. The flexible display panel 100 may be folded to have a certain curvature radius according to bending of the bending area BA.

The flexible display panel 100 according to an embodiment may include a first display area DA1, a second display area DA2, and one bending area BA. For example, with respect to a lengthwise direction X of the flexible display panel 100, the first display area DA1 may be disposed in one side (or a left region) of the flexible display panel 100, the second display area DA2 may be disposed in the other side (or a right region) of the flexible display panel 100, and the one bending area BA may be disposed between the first display area DA1 and the second display area DA2. Here, a width of the bending area BA may be set based on a curvature radius of the flexible display panel 100 folded in a curved shape. Also, the bending area BA may display an image corresponding to one frame on one screen along with the first and second display areas DA1 and DA2 and may be referred to as a bending display area.

The flexible display panel 100 according to an embodiment may include a glass substrate 110, a flexible substrate 130, a display unit 150, and a cover film 170.

The glass substrate 110 (or a supporting member) may include a glass material. The glass substrate 110 according to an embodiment may have a thickness of about 0.01 mm to 1.0 mm so as to maintain flatness of the flexible substrate 130 or to prevent oxygen or water from penetrating into the flexible display panel 100, but is not limited thereto and may have a thickness which varies based on a size of the flexible display apparatus 10. According to another embodiment, the glass substrate 110 may have a thickness of about 0.01 mm to 0.7 mm so as to prevent oxygen or water from penetrating into the flexible display panel 100 and in order for the flexible substrate 130 to be bent, but is not limited thereto and may have a thickness which varies based on a size of the flexible display apparatus 10.

The glass substrate 110 may include an open portion OP which is coupled to a rear surface of the flexible substrate 130 to overlap a bending area BA. That is, the glass substrate 110 according to an embodiment may include a plurality of supporting parts 111 and 113 and the open portion OP.

Each of the plurality of supporting parts 111 and 113 may support the rear surface of the flexible substrate 130 overlapping each of the plurality of display areas DA1 and DA2 and may include a curve-shaped inclined surface IP facing the open portion OP. The supporting part 111 may maintain flatness of the first display area DA1 and may be bent along with the first display area DA1, based on a thickness thereof, and the supporting part 113 may maintain flatness of the second display area DA2 and may be bent along with the second display area DA2, based on a thickness thereof.

The open portion OP may be disposed between the plurality of supporting parts 111 and 113 to overlap the bending area BA. The open portion OP may enable the bending area BA to be smoothly bent. Particularly, the open portion OP may decrease a bending stress including a compression stress and a tension stress which are applied to the bending area BA when the bending area BA is bent.

The open portion OP according to an embodiment may be formed through etching (or patterning) from the glass substrate 110 having a plate shape in a glass etching process which is performed after a process of manufacturing the flexible display panel 100 is completed. Therefore, the open portion OP may include the inclined surface IP having a curved shape. For example, the glass etching process may be a wet etching process using an etchant including hydrofluoric acid (HF).

Optionally, the open portion OP may be formed by a laser patterning process instead of a glass etching process. In this case, however, there is a problem where an expensive laser apparatus is used, and since the open portion OP includes a substantially vertical cut surface, there is a problem where a grinding process and a laser patterning process each performed on the cut surface and a cleaning process of removing a glass chip (or fragments) occurring in the grinding process are needed. On the other hand, the open portion OP based on the glass etching process may have an inclined surface having a curved shape on the basis of an etching process condition, and thus, a grinding process and a cleaning process are not additionally needed.

The flexible substrate 130 may include a plastic material which is capable of being bent in order for the bending area BA to be bent in a curved shape. For example, the flexible substrate 130 may include one material of polyimide (PI), polycarbonate (PC), polyethyleneterephthalate (PET), polymethylpentene (PMP), polymethylmethacrylate (PMMA), polynorborneen (PNB), polyethylenapthanate (PEN), polyethersulfone (PES), and cycloolefin copolymer (COS), and for example, may include an opaque or colored polyimide material.

The flexible substrate 130 according to the present disclosure may be formed by curing a plastic material which is coated, by a certain thickness, on a front surface of the glass substrate 110 having a plate shape where the open portion OP is not provided. Therefore, the glass substrate 110 may be directly coupled (or contact) to the rear surface of the flexible substrate 130. In other words, the flexible substrate 130 may be directly (or physically) coupled to a front surface of the glass substrate 110 without an intermediate layer such as an adhesive layer. Therefore, in the present disclosure, even after a process of manufacturing the flexible display panel 100 is completed, the supporting parts 111 and 113 of the glass substrate 110 may be maintained without being separated from the rear surface of the flexible substrate 130, and thus, a laser release process of separating the whole glass substrate 110 from the flexible substrate 130 may be omitted. In the present disclosure, since the flexible display panel 100 is manufactured even without using the expensive laser apparatus, the manufacturing cost of the flexible display panel may be reduced, a defect (particles or transfer caused by a surface roughness of a flexible substrate) caused by the laser release process may not occur, and a rear protection film attached on the rear surface of the flexible substrate 130 may be omitted, thereby enhancing the bending reliability of the flexible substrate 130.

The display unit 150 may be provided in the plurality of display areas DA and the bending area BA each defined on the flexible substrate 130. The display unit 150 may be referred to as a pixel array part.

The display unit 150 according to an embodiment may include a pixel array layer 151 and an encapsulation layer 153.

The pixel array layer 151 may include a plurality of pixels which are respectively provided in a plurality of pixel areas defined by a plurality of pixel driving lines provided in the bending area BA and the plurality of display areas DA of the flexible substrate 130 and display an image according to signals supplied through the pixel driving lines. Here, the pixel driving lines may include a plurality of data lines, a plurality of gate line, and pixel driving power sources.

Each of the plurality of pixels may include a pixel circuit layer, an anode electrode layer, a self-emitting device layer, and a cathode electrode layer.

The pixel circuit layer may be provided in a transistor region of each of the pixel areas and may be driven based on the signals supplied through the pixel driving lines to control light emission by the self-emitting device layer. The pixel circuit layer according to an embodiment may include at least two thin film transistors (TFTs), including a driving TFT provided in the transistor region of each pixel area defined on the flexible substrate 130, and at least one capacitor. Here, the pixel circuit layer may include at least one of an amorphous-silicon (a-Si) TFT, a poly-Si TFT, an oxide TFT, and an organic TFT. The pixel circuit layer may be covered by an overcoat layer provided on the flexible substrate 130 to have a relatively thick thickness.

The anode electrode layer may be provided on the overcoat layer overlapping an opening region defined in each pixel area and may be electrically connected to a source electrode of the driving TFT through an electrode contact hole provided in the overcoat layer. Here, the opening region of each pixel area may be defined by a bank pattern provided on the overcoat layer to cover an edge of the anode electrode layer.

The self-emitting device layer may be provided on the anode electrode layer provided in the opening region of each of the plurality of pixels. The self-emitting layer according to an embodiment may include an organic light emitting device, a quantum dot light emitting device, or an inorganic light emitting device. For example, the self-emitting device layer may be provided in a structure where a hole injection layer, a hole transporting layer, an organic light emitting layer, an electron transporting layer, and an electron injection layer are sequentially stacked. Here, one or two or more of the hole injection layer, the hole transporting layer, the electron transporting layer, and the electron injection layer may be omitted. The organic light emitting layer may be provided to emit light (for example, white light) of the same color for each pixel and may be provided to emit light (for example, red, green, or blue light) of different color for each pixel.

The cathode electrode layer may be provided on the flexible substrate 30 and may be connected to the self-emitting device layer provided in each pixel area in common. The cathode electrode layer may be referred to as a common layer.

The encapsulation layer 153 may be provided on the flexible substrate 130 to surround the pixel array layer 151. The encapsulation layer 153 may protect the pixel array layer 151 and the like from an external impact and may prevent oxygen, water, and/or particles from penetrating into the self-emitting device layer.

The encapsulation layer 153 according to an embodiment may include at least one inorganic layer. Also, the encapsulation layer 153 may further include at least one organic layer. For example, the encapsulation layer 153 may include a first inorganic encapsulation layer, an organic encapsulation layer, and a second inorganic encapsulation layer. Each of the first and second encapsulation layers may include one inorganic material of silicon oxide (SiOx), silicon nitride (SiNx), silicon oxynitride (SiON), titanium oxide (TiOx), and aluminum oxide (AlOx). Also, the organic encapsulation layer may include one organic material of acryl resin, epoxy resin, phenolic resin, polyamide resin, polyimide resin, and benzocyclobutene resin. The organic encapsulation layer may be referred to as a particle cover layer.

Additionally, the flexible substrate 130 may further include a pad part and a gate driving circuit unit.

The pad part may include a plurality of pad electrodes provided in at least one edge of the flexible substrate 130. The plurality of pad electrodes may be respectively connected to, through a plurality of link lines, the pixel driving lines provided in the display unit 150 and may be electrically connected to the gate driving circuit unit. The pad part may be connected to the panel driving circuit unit 200 and may provide a signal, supplied from the panel driving circuit unit 200, to the gate driving circuit unit and the pixel driving lines provided in the display unit 150 through the plurality of link lines.

The gate driving circuit unit may be provided in a left edge and/or a right edge of the flexible substrate 130 and may be connected to one end and/or the other end of each of the plurality of gate lines. In response to a gate control signal supplied through the pad part, the gate driving circuit unit may generate the gate control signal and may provide the generated gate control signal to each of the plurality of gate lines. The gate driving circuit unit may be a gate-embedded circuit which is formed along with a process of manufacturing a TFT of each pixel, but is not limited thereto.

The cover film 170 may include a flexible film which is thin and transparent like plastic. The cover film 170 may be attached on the encapsulation layer 153 to cover the display unit 150 except the pad part provided on the flexible substrate 130. The cover film 170 may be attached on an upper surface of the encapsulation layer 153 by an optical adhesive member. The cover film 170 may be disposed in an outermost portion of the flexible display panel 100 and may protect the display unit 150 from an external impact.

Additionally, the flexible display panel 100 according to an embodiment of the present disclosure may further include a barrier layer, a touch sensor layer, and a polarization layer.

The barrier layer may be provided on an upper surface of the encapsulation layer 153 and may prevent water from penetrating into the flexible display panel 100. The barrier layer may include a material (for example, a polymer material) which is low in water vapor transmission rate.

The touch sensor layer may be provided between the barrier layer and the encapsulation layer 153, or may be provided on the barrier layer. The touch sensor layer may include a mutual-capacitive or self-capacitive touch sensor or touch electrode, in which a capacitance varies based on a user touch.

The polarization layer may be provided on the touch sensor layer or the barrier layer and may polarize light emitted from each pixel or may prevent reflection of external light, thereby enhancing the optical characteristic of the flexible display panel 100. For example, the polarization layer may change light, reflected by lines and/or a thin film transistor (TFT) provided in each pixel, to a circular polarization state to enhance the visibility and contrast ratio of the flexible display apparatus. For example, the polarization layer according to an embodiment may include a circular polarizer. Optionally, the polarization layer may be provided as a film type including a circular polarizer and may be attached on the touch sensor layer or the barrier layer by an adhesive.

Additionally, the flexible display panel 100 according to an embodiment of the present disclosure may further include a wavelength conversion layer. When the flexible display panel 100 includes the wavelength conversion layer, a self-emitting device layer may be configured to emit white light.

The wavelength conversion layer may be disposed between the encapsulation layer 153 and the cover film 170. The wavelength conversion layer may vary a wavelength of light emitted from each pixel. For example, the wavelength conversion layer may be disposed in the encapsulation layer 153, between the encapsulation layer 153 and the barrier layer, between the encapsulation layer 153 and the polarization layer, between the barrier layer and the polarization layer, or between the barrier layer (or the polarization layer) and the cover film 170 to overlap an opening region of each pixel.

The wavelength conversion layer according to an embodiment may include a color filter which transmits only a wavelength, corresponding to a color set in each pixel, of light emitted from the self-emitting device layer to the cover film 170. For example, the wavelength conversion layer may transmit only a wavelength of red, green, or blue light. For example, in the flexible display apparatus according to the present disclosure, when one unit pixel includes first to third pixels adjacent to one another, a wavelength conversion layer provided in the first pixel may include a red color filter, a wavelength conversion layer provided in the second pixel may include a green color filter, and a wavelength conversion layer provided in the third pixel may include a blue color filter. Additionally, in the flexible display apparatus according to the present disclosure, one unit pixel may further include a white pixel where the wavelength conversion layer is not provided.

According to another embodiment, the wavelength conversion layer may include a quantum dot having a size, which re-emits light on the basis of light emitted from the self-emitting device layer to the cover film 170 to emit light of a color set in each pixel. Here, the quantum dot may be selected from among CdS, CdSe, CdTe, CdZnSeS, ZnS, ZnSe, GaAs, GaP, GaAs—P, Ga—Sb, InAs, InP, InSb, AlAs, AlP, and AlSb. For example, the wavelength conversion layer of the first pixel may include a quantum dot such as CdSe or InP, the wavelength conversion layer of the second pixel may include a quantum dot such as CdZnSeS, and the wavelength conversion layer of the third pixel may include a quantum dot such as ZnSe. Accordingly, the flexible display apparatus where the wavelength conversion layer includes the quantum dot may have a high color reproduction rate.

According to another embodiment, the wavelength conversion layer may include a color filter including the quantum dot.

Optionally, the encapsulation layer 153 may be changed to a face seal which surrounds the pixel array layer 151, and in this case, the cover film 170 may be coupled to the pixel array layer 151 by the face seal.

The panel driving circuit 200 may be connected to the pad part provided on the flexible substrate 130 and may supply the pad part with a signal for displaying an image on the display unit 150. The panel driving circuit 200 according to an embodiment may include a flexible circuit film 210 and a driving integrated circuit (IC) 230.

The flexible circuit film 210 may be attached on the pad part of the flexible substrate 130 through a film attachment process.

The driving IC 230 may be mounted on the flexible circuit film 210 by a chip bonding process or a surface mount process. The driving IC 230 may generate a data signal and a gate control signal on the basis of video data and a timing synchronization signal each supplied from an external display driving system, supply the data signal to a data line of each pixel through the pad part, and supply the gate control signal to the gate driving circuit unit.

Optionally, the driving IC 230 may be mounted on the flexible substrate 130 without being mounted on the flexible circuit film 210 and may be electrically connected to the pad part, the gate driving circuit unit, and the pixel driving signal line provided in the display unit 150. In this case, the flexible circuit film 210 may transfer a signal between the pad part and the display driving system.

The flexible display panel 100 according to an embodiment may further include a de-multiplexer provided on the flexible substrate 130. The de-multiplexer circuit may be provided between the plurality of data lines and the driving IC 230 and may sequentially provide two or more data lines with data signals which are time-divisionally output through output channels of the driving IC 230. When the flexible display panel 100 includes the de-multiplexer circuit, the flexible display apparatus 10 according to the present disclosure may decrease the number of output channels of the driving IC 230.

The flexible display apparatus 10 according to an embodiment of the present disclosure may further include a filler 190 (or an elastic portion).

The filler 190 may be filled (or buried) into the open portion OP provided on the glass substrate 110 of the flexible display panel 100. The filler 190 may prevent water or oxygen from penetrating into the flexible substrate 130 through the opening portion OP. Also, when the flexible display panel 100 is repeatedly bent (or folded), the filler 190 may prevent partial detachment between the flexible substrate 310 and the glass substrate 110 adjacent to the open portion OP. The open portion OP with the filler 190 filled thereinto may be defined as an elastic portion of the glass substrate 110, and in this case, the glass substrate 110 may include a plurality of supporting parts and the elastic portion connected between the plurality of supporting parts. In this case, the supporting parts and the elastic portion may be formed of different materials, and a boundary surface between the elastic portion and each of the supporting parts may have a concave curved shape or an inclined shape which is inclined at a certain angle.

The filler 190 may be provided in the open portion 190 overlapping the bending area BA of the flexible display panel 100, and thus, when the bending area BA of the flexible display panel 100 is bent (or folded), a shape based on a width and a thickness of the filler 190 may be set based on a position of a neutral plane based on a compression stress and a tension stress each applied to the bending area BA of the flexible display panel 100.

Liquid resin (for example, organic resin) may be filled (or buried) into the open portion OP through a jetting process or a dispensing process, and then, by curing the liquid resin through a photo-curing process, the filler 190 according to an embodiment may be formed. The filler 190 may include the liquid resin, and thus, may be filled into (or penetrate into) a gap between the flexible substrate 130 and the glass substrate 110 adjacent to the open portion OP. To this end, the filler 190 may include a material which has an adhesive characteristic and a damp proof characteristic and may include an optical bond which is cured by ultraviolet (UV). For example, the filler 190 may include an acryl-based or silicone-based organic adhesive material. Also, the filler 190 may have an elongation rate of 600% or more.

A flexible film may be attached on the open portion OP through a laminating process using an adhesive instead of the filler 190 including the liquid resin. However, the laminating process performed on the flexible film may need an align apparatus for precise alignment, causing a reduction in productivity. Also, a void may occur between the flexible film attached on the open portion OP and the glass substrate 110, and the reliability of the flexible display panel may be reduced due to penetration of water or oxygen through the void.

The flexible display apparatus 10 according to an embodiment of the present disclosure may include the glass substrate 110 including the open portion OP overlapping the bending area BA of the flexible display panel 100, and thus, the glass substrate 110 may enhance reliability for preventing penetration of water or oxygen and the open portion OP may decrease a bending stress applied to the bending area BA of the flexible display panel 100, thereby enhancing bending reliability. Also, the flexible display apparatus 10 according to an embodiment of the present disclosure may further include the filler 190 filled into the open portion OP of the glass substrate 110, and thus, may prevent or minimize a reduction in the bending reliability of the flexible display panel 100 and may more enhance reliability for preventing penetration of water or oxygen.

As a result, the flexible display apparatus 10 according to an embodiment of the present disclosure may be manufactured even without a laser release process, and thus, bending reliability and reliability for preventing penetration of water or oxygen may be enhanced. Also, according to the present disclosure, a laser release process of separating the whole glass substrate 110 from the flexible substrate 130, a rear protection film attached on the rear surface of the flexible substrate 130, and an attachment process performed on the rear protection film may be omitted, thereby increasing productivity.

Figure 3:
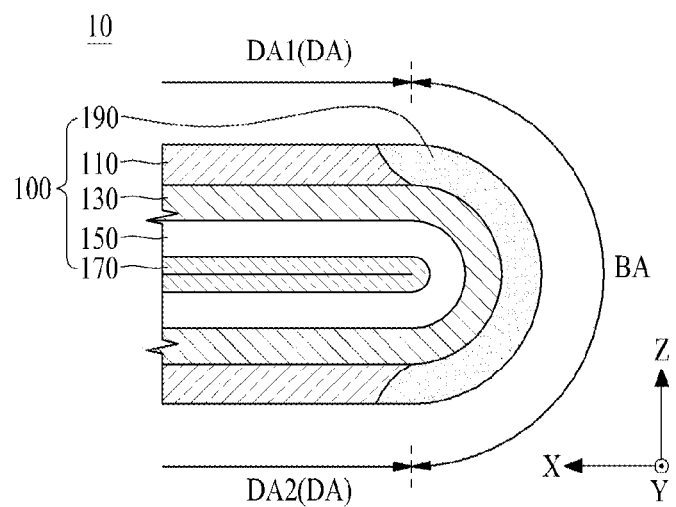
FIG. 3 is a cross-sectional view for describing an inner bending structure of a flexible display apparatus according to an embodiment of the present disclosure.

FIG. 3 is a cross-sectional view for describing an inner bending structure of a flexible display apparatus according to an embodiment of the present disclosure.

Referring to FIGS. 1 and 3, in a flexible display apparatus 10 according to an embodiment of the present disclosure, the flexible substrate 130 may be bent in an inner bending type where the plurality of display areas DA1 and DA2 face each other. That is, the flexible display panel 100 unfolded in a planar state may be folded in a direction in which the plurality of display areas DA1 and DA2 directly face each other according to bending of the bending area BA. In this case, the glass substrate 110 may be disposed in an outermost portion of the folded flexible display panel 100, and thus, the display unit 150 (or a screen) may not be exposed at the outside, whereby the glass substrate 110 and the like may protect the display unit 150 from an external impact.

Figure 4:
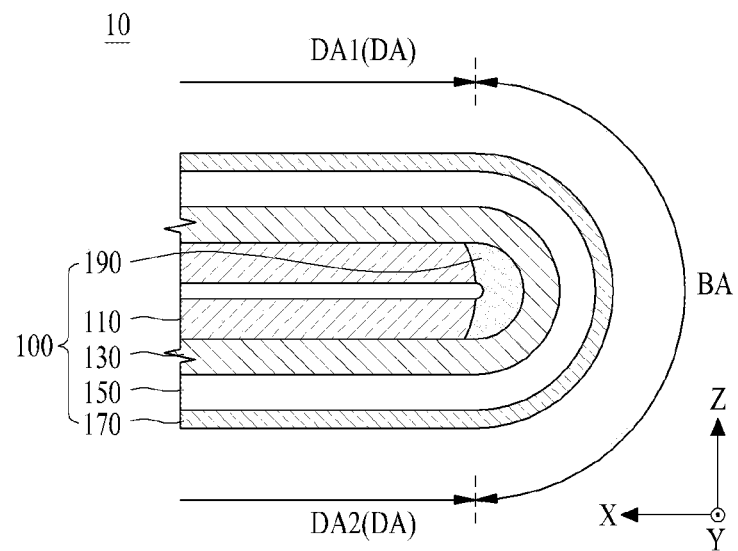
FIG. 4 is a cross-sectional view for describing an inner bending structure of a flexible display apparatus according to an embodiment of the present disclosure.

FIG. 4 is a cross-sectional view for describing an outer bending structure of a flexible display apparatus according to an embodiment of the present disclosure.

Referring to FIGS. 1 and 4, in a flexible display apparatus 10 according to an embodiment of the present disclosure, the flexible substrate 130 may be bent in an outer bending type where the supporting parts 111 and 113 of the flexible substrate 130 face each other. That is, the flexible display panel 100 unfolded in a planar state may be folded in a direction in which the supporting parts 111 and 113 of the flexible substrate 130 directly face each other according to bending of the bending area BA. In this case, the cover film 170 may be disposed in an outermost portion of the folded flexible display panel 100, and thus, the display unit 150 (or a screen) may be exposed at the outside, whereby the flexible display panel 100 may display an image on the display unit 150 even in a folded state.

Figure 5A:
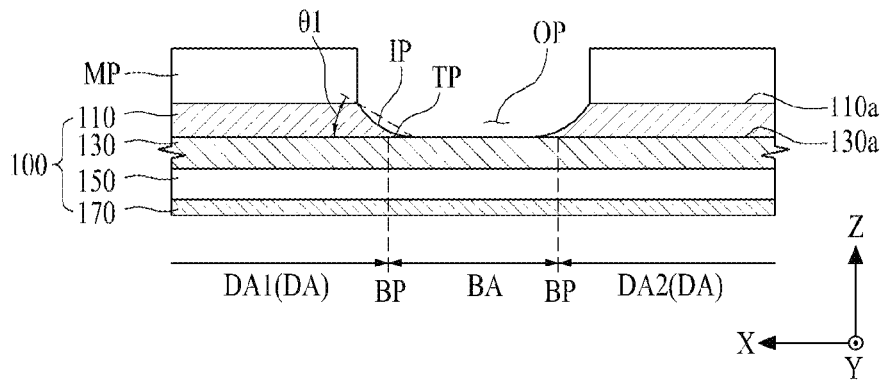
FIGS. 5A to 5C are cross-sectional views for describing various examples of an open portion in a flexible display apparatus according to an embodiment of the present disclosure.
Figure 5B:
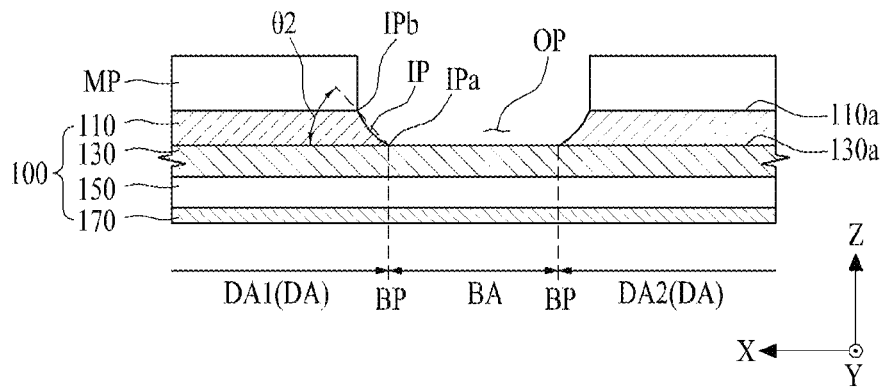
Figure 5C:
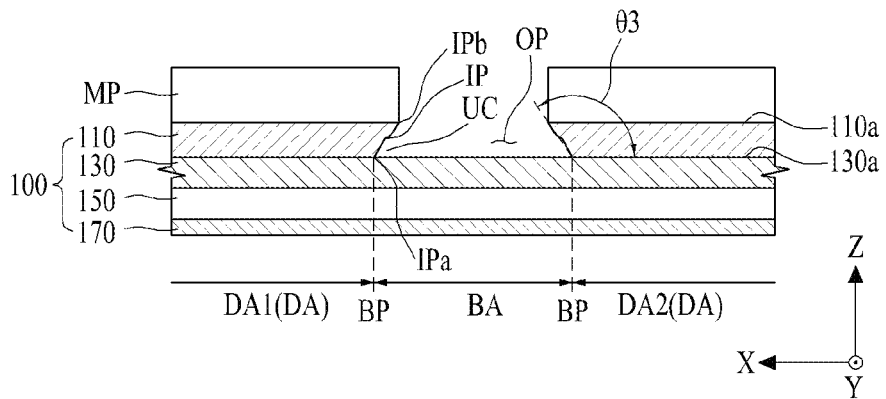

FIGS. 5A to 5C are cross-sectional views for describing various examples of an open portion in a flexible display apparatus according to an embodiment of the present disclosure.

Referring to FIG. 5A, an open portion OP according to a first embodiment of the present disclosure may be formed by a glass etching process based on a soft-etching condition. Here, the soft-etching condition may be defined as a glass etching process which is performed for a time which is shorter than a predetermined reference etching time, for etching glass by a certain thickness.

A mask pattern MP may be formed on a rear surface 110a of a glass substrate 110 overlapping a plurality of display areas DA1 and DA2 except a bending area BA, and then, the open portion OP according to the first embodiment may be formed by etching a region, overlapping the bending area BA, of the glass substrate 110 in an oblique shape through a glass etching process using the mask pattern MP as a mask, based on the soft-etching condition.

The open portion OP according to the first embodiment may include an inclined portion IP having a concave curved shape. In this case, a cross-sectional area of the open portion OP parallel to the rear surface 130a of the flexible substrate 130 may increase in a direction distancing from the rear surface 130a of the flexible substrate 130. For example, the cross-sectional area of the open portion OP may be defined as a size of a horizontal cut surface which is cut with respect to a horizontal surface parallel to the rear surface 130a of the flexible substrate 130. A first angle "θ1" between the inclined surface IP of the open portion OP and the rear surface 130a of the flexible substrate 130 may be an acute angle, and for example, may be less than 15 degrees.

The inclined surface IP illustrated in FIG. 5A is conceptually illustrated for convenience of description, and thus, the first angle "θ1" is not limited to an angle between the inclined surface IP of the open portion OP and the rear surface 130a of the flexible substrate 130 each illustrated in FIG. 5A.

The inclined surface IP of the open portion OP according to the first embodiment may include a tail portion which is formed by the glass etching process based on the soft-etching condition, and thus, overlaps the bending area BA. Since an etching process time is shorter than the reference etching time, a portion of the glass substrate 110 contacting a boundary portion BP between the bending area BA and the display area DA is not completely removed, and thus, the tail portion TP may be defined as a non-etched portion having a thickness which is progressively thinned in a direction from the boundary portion BP between the bending area BA and the display area DA to a center portion of the bending area BA. When the bending area BA is bent, the tail portion TP provided in the inclined portion IP of the open portion OP may be broken from the inclined surface IP, causing a particle defect or causing a scratch or a crack of the flexible substrate 130.

Referring to FIG. 5B, an open portion OP according to a second embodiment of the present disclosure may be formed by a glass etching process based on a just-etching condition. Here, the just-etching condition may be defined as a glass etching process which is performed for a predetermined reference etching time so as to etching glass by a certain thickness.

A mask pattern MP may be formed on a rear surface 110a of a glass substrate 110 overlapping a plurality of display areas DA1 and DA2 except a bending area BA, and then, the open portion OP according to the second embodiment may be formed by etching a region, overlapping the bending area BA, of the glass substrate 110 in a concave cross-sectional shape through a glass etching process using the mask pattern MP as a mask, based on the just-etching condition.

The open portion OP according to the second embodiment may include an inclined portion IP having a concave curved shape. In this case, a cross-sectional area of the open portion OP parallel to the rear surface 130a of the flexible substrate 130 may increase in a direction distancing from the rear surface 130a of the flexible substrate 130. A second angle "$\theta 2$" between the inclined surface IP of the open portion OP and the rear surface 130a of the flexible substrate 130 may be an acute angle, and for example, may be 15 degrees to 70 degrees.

The inclined surface IP of the open portion OP according to the second embodiment may be formed by the glass etching process based on the just-etching condition, and thus, may include a concave curved shape between one end IPa disposed on the rear surface 130a of the flexible substrate 130 overlapping a boundary portion BP between the bending area BA and a display area DA and the other end IPb disposed on the rear surface 130a of the flexible substrate 130 adjacent to the boundary portion BP. In this case, the inclined surface IP of the open portion OP according to the second embodiment may be formed not to include the tail portion TP illustrated in FIG. 5A, based on the glass etching process based on the just-etching condition. Therefore, the inclined surface IP of the open portion OP according to the second embodiment may be formed to have an acute angle (i.e., an inclined degree of 15 degrees to 17 degrees) from the rear surface 130a of the flexible substrate 130, and thus, the flexible display panel 100 may be more suitable for the inner bending structure.

For example, when the bending area BA of the flexible display panel 100 is bent in the inner bending structure, the inclined surface IP of the open portion OP according to the second embodiment may not be surrounded by the bending area BA, and thus, a relatively low bending stress (or a low pressure) may be applied to the inclined surface IP of the open portion OP due to the bending area BA bent in the inner bending structure. On the other hand, when the bending area BA of the flexible display panel 100 is bent in the outer bending structure, the inclined surface IP of the open portion OP according to the second embodiment may be surrounded by the bending area BA, and thus, a relatively high bending stress (or a high pressure) may be applied to the inclined surface IP of the open portion OP due to the bending area BA bent in the outer bending structure. Therefore, when the bending area BA is bent in the inner bending structure, a relatively low bending stress may be applied to one end IPa, which is adjacent to the bending area BA and has a relatively thin thickness, of the inclined surface IP of the open portion OP, and thus, the flexible display panel 100 may not be broken or damaged, but when the bending area BA is bent in the outer bending structure, a relatively high bending stress may be applied to the one end IPa, and thus, the flexible display panel 100 may be broken or damaged. Accordingly, the open portion OP according to the second embodiment may be applied to the flexible display panel 100 which is folded or bent in the inner bending structure.

Referring to FIG. 5C, an open portion OP according to a third embodiment of the present disclosure may be formed by a glass etching process based on an over-etching condition. Here, the over-etching condition may be defined as a glass etching process which is performed for more than a predetermined reference etching time so as to etching glass by a certain thickness.

A mask pattern MP may be formed on a rear surface 110a of a glass substrate 110 overlapping a plurality of display areas DA1 and DA2 except a bending area BA, and then, the open portion OP according to the third embodiment may be formed by etching a region, overlapping the bending area BA, of the glass substrate 110 in a convex cross-sectional shape through a glass etching process using the mask pattern MP as a mask, based on the over-etching condition.

The open portion OP according to the third embodiment may include an inclined portion IP having a concave curved shape or a shape which is inclined at a certain angle. In this case, a cross-sectional area of the open portion OP parallel to the rear surface 130a of the flexible substrate 130 may decrease in a direction distancing from the rear surface 130a of the flexible substrate 130. A third angle "$\theta 3$" between the inclined surface IP of the open portion OP and the rear surface 130a of the flexible substrate 130 may be an obtuse angle, and for example, may be 105 degrees to 145 degrees. Therefore, the open portion OP according to the third embodiment may include an undercut UC between the rear surface 130a of the flexible substrate 130 and the inclined surface IP. Here, an etching process time may be longer than the reference etching time, a portion of the glass substrate 110 contacting the boundary portion BP between the bending area BA and the display area DA may be over-etched, thereby forming the undercut UC.

The inclined surface IP of the open portion OP according to the third embodiment may be formed by the glass etching process based on the over-etching condition, and thus, may include a concave curved shape or a shape, which is inclined in a direction opposite to a center portion of the open portion OP, between one end IPa disposed on the rear surface 130a of the flexible substrate 130 overlapping a boundary portion BP between the bending area BA and a display area DA and the other end IPb disposed on the rear surface 130a of the glass substrate 110 in the bending area BA. Therefore, the inclined surface IP of the open portion OP according to the third embodiment may be formed to have an obtuse angle (i.e., an inclined degree of 105 degrees to 145 degrees) from the rear surface 130a of the flexible substrate 130, and thus, the flexible display panel 100 may be applied to all of the inner bending structure and the outer bending structure but may be more suitable for the outer bending structure.

For example, when the bending area BA of the flexible display panel 100 is bent in the inner bending structure, the inclined surface IP of the open portion OP according to the third embodiment may not be surrounded by the bending area BA, and thus, a relatively low bending stress (or a low pressure) may be applied to the inclined surface IP of the open portion OP due to the bending area BA bent in the inner bending structure. Accordingly, the open portion OP according to the third embodiment may be applied to the flexible display panel 100 which is folded or bent in the inner bending structure.

Moreover, when the bending area BA of the flexible display panel 100 is bent in the outer bending structure, the inclined surface IP of the open portion OP according to the third embodiment may be surrounded by the bending area BA, and thus, the inclined surface IP of the open portion OP may guide outer bending of the bending area BA or may be inclined or may have a concave shape. Therefore, even when the bending area BA is bent in the outer bending structure, the inclined surface IP of the open portion OP may be inclined or may have a concave shape, and thus, even when the bending area BA is bent in the outer bending structure, a relatively low bending stress may be applied thereto, whereby the flexible display panel 100 may not be broken or damages. Accordingly, the open portion OP according to the third embodiment may be applied to the flexible display panel 100 which is folded or bent in the outer bending structure, and particularly, the open portion OP may guide outer bending of the bending area BA and thus may be applied to the flexible display panel 100 which is bent in the outer bending structure rather than the inner bending structure.

Figure 6:
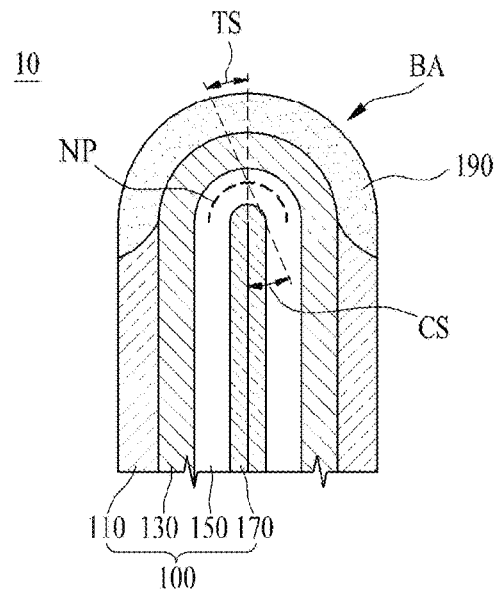
FIG. 6 is a diagram for describing a bending stress of a bending area and a filler of a flexible display apparatus according to an embodiment of the present disclosure.

FIG. 6 is a diagram for describing a bending stress of a bending area and a filler of a flexible display apparatus 10 according to an embodiment of the present disclosure.

Referring to FIG. 6, in the flexible display apparatus 10 according to an embodiment of the present disclosure, a thickness of the filler 190 filled into an open portion OP of a glass substrate 110 may be set so that a neutral plane NP is disposed in a display unit 150 in a bending area BA when a display panel 100 is bent.

In detail, when the bending area BA of the flexible display panel 100 is bent at a predetermined curvature radius along the inner bending structure (or the outer bending structure), a compression stress (or strain) CS and a tension stress TS may be applied to the flexible display panel 100 on the basis of mechanical physical property values such as an elastic coefficient, a thickness, a curvature, and a Poisson's ratio of the a flexible substrate 130, the display unit 150, a cover film 170, and the filler 190. In this case, the bending area BA of the flexible display panel 100 may include a neutral plane NP where the compression stress CS and the tension stress TS are zero (0), and thus, as a distance to the neutral plane NP increases, relatively high compression stress CS and tension stress T may be applied thereto. Therefore, a thickness of the filler 190 may be set within a range where a pixel circuit layer of the display unit 150 is disposed in the neutral plane NP, and thus, the pixel circuit layer of the display unit 150 may be located in the neutral plane NP. Accordingly, even when the filler 190 and the bending area BA of the flexible display panel 100 are bent at a certain curvature radius, a bending stress of zero (0) may be applied thereto, and thus, the pixel circuit layer may not be damaged by the bending stress and may be bent.

Figure 7A:
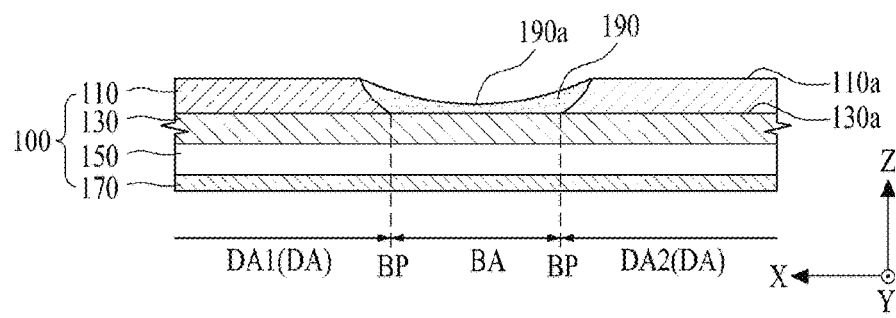
FIGS. 7A to 7C are diagrams for describing various structures of a filler of a flexible display apparatus according to an embodiment of the present disclosure.
Figure 7B:
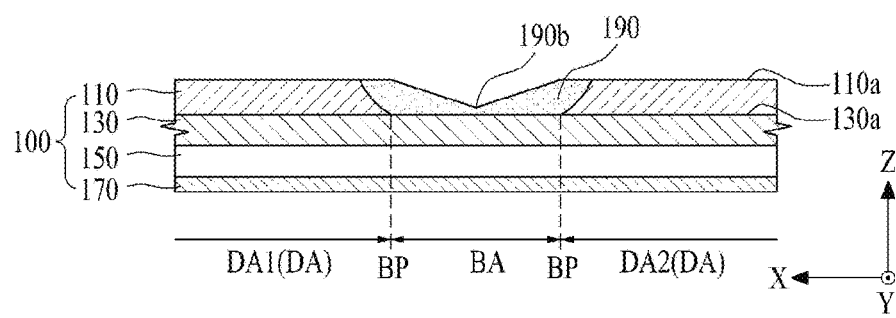
Figure 7C:
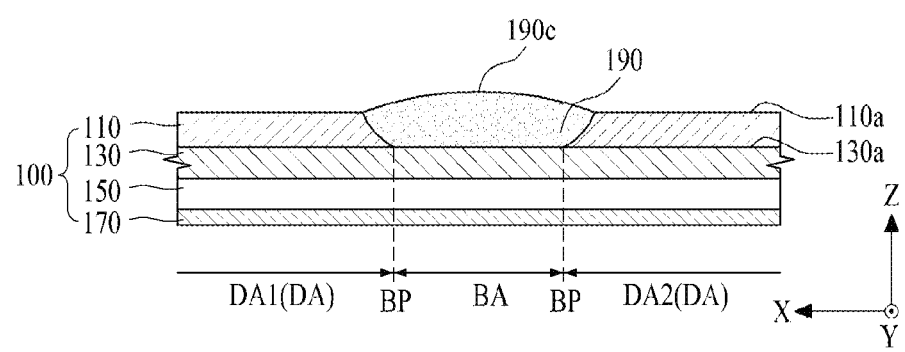

FIGS. 7A to 7C are diagrams for describing various structures of a filler of a flexible display apparatus according to an embodiment of the present disclosure.

Referring to FIGS. 6 and 7A, a filler 190 according to a first embodiment may be filled into an open portion to have a concave cross-sectional shape. In this case, the filler 190 may have a thickness which is thinnest in a center portion of the bending area BA. That is, a rear surface 190a of the filler 190 may have a concave curved shape between a rear surface 110a of a glass substrate 110 and the center portion of the bending area BA. Therefore, the filler 190 may have a thickness which is progressively thinned in a direction from the rear surface 110a of the glass substrate 110 to the center portion of the bending area BA.

Referring to FIGS. 6 and 7B, a filler 190 according to a second embodiment may be filled into an open portion to include a groove portion 190b which is concavely provided. In this case, the groove portion 190b of the filler 190 may be disposed on a center portion of a bending area BA. That is, the groove portion 190b of the filler 190 may include an inclined portion which is inclined from a rear surface 110a of a glass substrate 110 to the center portion of the bending area BA. Therefore, the filler 190 may have a thickness which is progressively thinned in a direction from the rear surface 110a of the glass substrate 110 to the center portion of the bending area BA. For example, the groove portion 190b of the filler 190 may include a Y-shaped or W-shaped cross-sectional surface.

The filler 190 according to the first and second embodiments may have a thickness which is progressively thinned in a direction closer to the center portion of the bending area BA, and thus, the bending area BA may be easily bent. Particularly, when the bending area BA of the flexible display panel 100 is bent in the outer bending structure, agglomeration occurring in the center portion of the bending area BA may be minimized, and damage of the bending area BA caused by the agglomeration may be prevented.

Referring to FIGS. 6 and 7C, a filler 190 according to a third embodiment may be fully filled into an open portion to have a convex cross-sectional shape. In this case, the filler 190 may have a thickness which is thickest in a center portion of a bending area BA. That is, a rear surface 190c of the filler 190 may have a convex curved shape between a rear surface 110a of a glass substrate 110 and the center portion of the bending area BA. Accordingly, the filler 190 may have a thickness which is progressively thickened in a direction from the rear surface 110a of the glass substrate 110 and the center portion of the bending area BA.

The filler 190 according to the third embodiment may more stably support the bending area BA of the flexible display panel 100 and may absorb (or buffer) an impact applied to the bending area BA of the flexible display panel 100, thereby the reliability and durability of the bending area BA of the flexible display panel 100.

Figure 8:
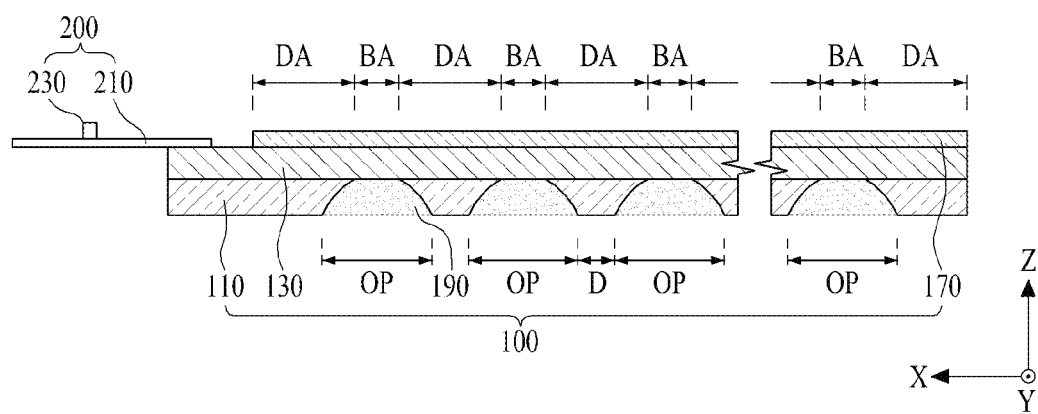
FIG. 8 is a cross-sectional view for describing a flexible display apparatus according to another embodiment of the present disclosure.

FIG. 8 is a cross-sectional view for describing a flexible display apparatus 30 according to another embodiment of the present disclosure and illustrates an example where two or more open portions are provided in a glass substrate of a flexible di splay panel in a flexible display apparatus according to an embodiment of the present disclosure illustrated in FIGS. 1 to 7C. Hereinafter, therefore, only an open portion and elements relevant thereto will be described, and repetitive descriptions of the other elements are omitted.

Referring to FIG. 8, the flexible display apparatus 30 according to another embodiment of the present disclosure may be applied to a rollable display apparatus and may include a plurality of display areas DA and a bending area BA between two adjacent of display area of the plurality of display areas DA. In this case, a width of each of the plurality of display areas DA and a width of the bending area BA may be set based on a curvature radius where a flexible display panel 100 is wound in a spiral shape.

In the flexible display apparatus 30 according to another embodiment of the present disclosure, a glass substrate 110 may include a plurality of open portions OP respectively overlapping a plurality of bending areas BA.

The plurality of open portions OP may be provided on the glass substrate 110 to have a certain interval D. Each of the plurality of open portions OP may include an inclined surface having a curved shape. The open portions OP are as described above, and thus, their repetitive descriptions are omitted.

The glass substrate 110 according to the present embodiment may include a plurality of supporting parts which are parallel to one another with an open portion OP therebetween.

The plurality of supporting parts according to an embodiment may support the flexible substrate 130 overlapping each of the plurality of display areas DA in a planar state. In this case, the flexible substrate 130 may be wound in a spiral shape according to bending of each of the plurality of bending areas BA, and in this case, each of the plurality of display areas DA may maintain a planar state.

According to another embodiment, the plurality of supporting parts may support the flexible substrate 130 overlapping each of the plurality of display areas DA and may be bent along with bending of the flexible substrate 130. In this case, the flexible substrate 130 may be wound in a spiral shape according to bending of each of the plurality of display areas DA and bending of each of the plurality of bending areas BA. To this end, the plurality of supporting parts (i.e., the glass substrate 110) may be etched by a glass etching process to have a thickness which enables each of the supporting parts to be bent along with bending of the flexible substrate 130. For example, the glass substrate 110 may prevent water or oxygen from penetrating into the flexible substrate 130 and may be etched to have a thickness of 0.01 mm to 1.0 mm which enables the glass substrate 110 to be bent along with the flexible substrate 130.

According to another embodiment, the flexible display apparatus 30 may further include a filler 190 filled (or buried) into the plurality of open portions OP. The filler 190 is as described above, and thus, its repetitive description is omitted.

Figure 9A:
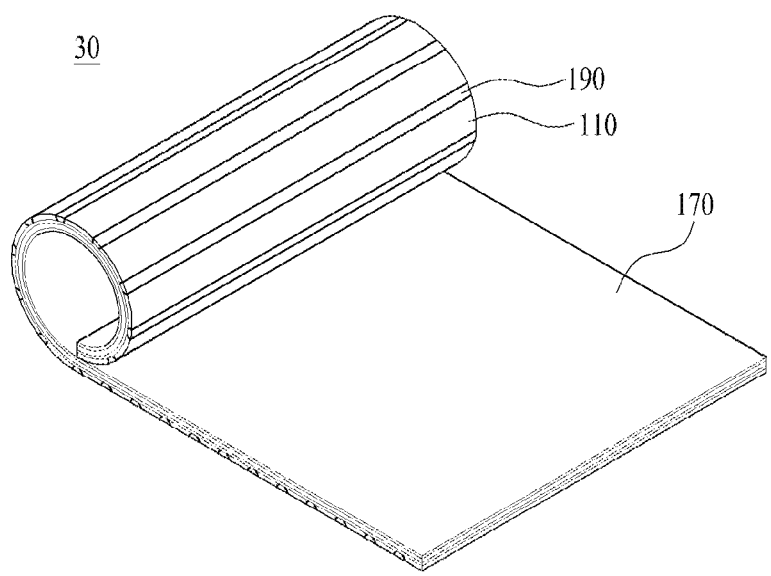
FIG. 9A is a diagram illustrating an inner winding structure of a flexible display apparatus according to another embodiment of the present disclosure.
Figure 9B:
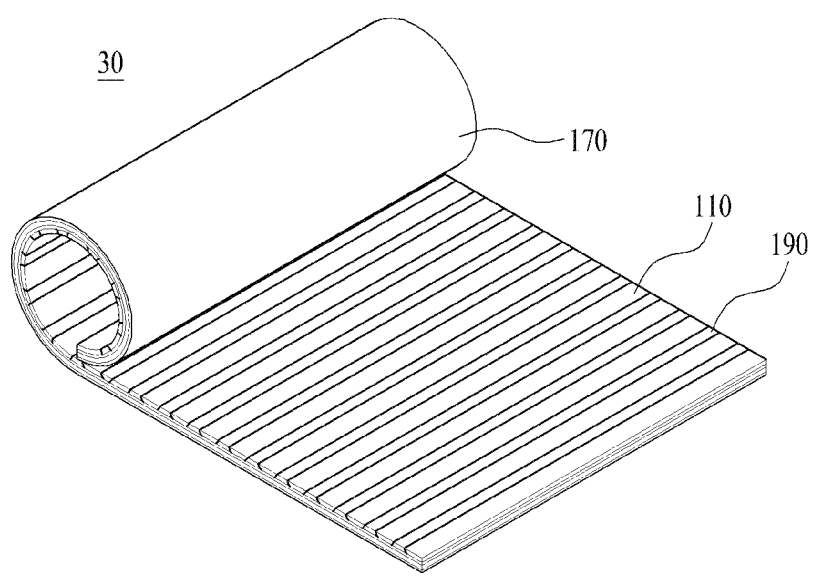
FIG. 9B is a diagram illustrating an outer winding structure of a flexible display apparatus according to another embodiment of the present disclosure.

The flexible display apparatus 30 according to another embodiment of the present disclosure may be wound in a spiral shape along an inner winding structure based on the inner bending structure of the flexible display panel 100 as illustrated in FIG. 9A, or as illustrated in FIG. 9B, may be wound in a spiral shape along an outer winding structure based on the outer bending structure of the flexible display panel 100.

Figure 10A:
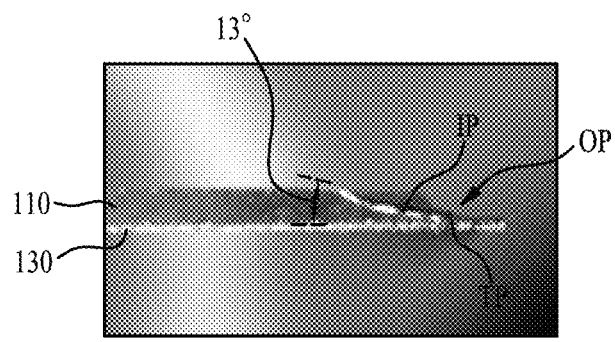
FIGS. 10A to 10D are microscope photographs illustrating a shape of an open portion based on a glass etching condition in a flexible display apparatus according to an embodiment of the present disclosure.
Figure 10B:
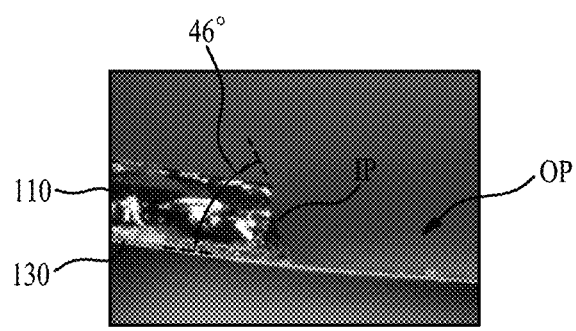
Figure 10C:

FIGS. 10A to 10D are microscope photographs illustrating a shape of an open portion based on a glass etching condition in a flexible display apparatus according to an embodiment of the present disclosure. FIG. 10A shows a shape of an open portion based the soft-etching condition, FIG. 10B shows a shape of an open portion based the just-etching condition, FIG. 10C shows a shape of an open portion based the over-etching condition according to the first embodiment, and FIG. 10C shows a shape of an open portion based the over-etching condition according to the second embodiment.

As seen in FIG. 10A, as a result obtained when an open portion OP is formed by performing a glass etching process based on the soft-etching condition on a glass substrate 110, it may be checked that an angle between an inclined surface IP of the open portion OP and a rear surface of a flexible substrate 130 is measured as 13 degrees and the inclined surface IP of the open portion OP is formed to include a tail portion TP on the basis of the soft-etching condition.

As seen in FIG. 10B, as a result obtained when an open portion OP is formed by performing a glass etching process based on the just-etching condition on a glass substrate 110, it may be checked that an angle between an inclined surface IP of the open portion OP and a rear surface of a flexible substrate 130 is measured as 46 degrees and the inclined surface IP of the open portion OP is formed to have a concave curved shape without a tail portion TP, based on the just-etching condition.

As seen in FIG. 10C, as a result obtained when an open portion OP is formed by performing a glass etching process based on the over-etching condition according to the first embodiment on a glass substrate 110, it may be checked that an angle between an inclined surface IP of the open portion OP and a rear surface of a flexible substrate 130 is measured as 107 degrees and the inclined surface IP of the open portion OP is formed to have a concave curved shape or a shape which includes an undercut UC and is inclined at a certain angle without a tail portion TP, based on the over-etching condition.

Figure 10D:
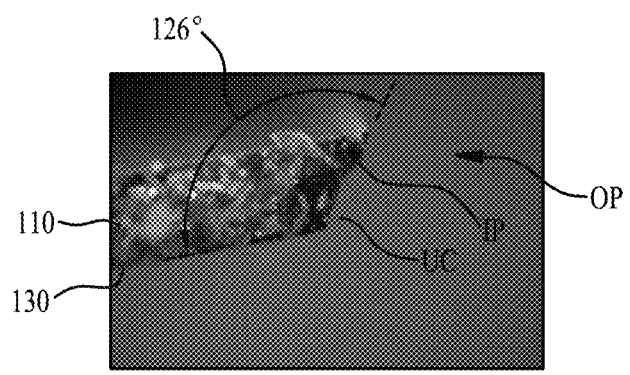

As seen in FIG. 10D, as a result obtained when an open portion OP is formed by performing a glass etching process based on the over-etching condition according to the second embodiment, having a time longer than that of the over-etching condition according to the first embodiment, on a glass substrate 110, it may be checked that an angle between an inclined surface IP of the open portion OP and a rear surface of a flexible substrate 130 is measured as 126 degrees and the inclined surface IP of the open portion OP is formed to have a convex curved shape or a concave curved shape which includes a deeper undercut UC and is inclined at a certain angle without a tail portion TP, based on the over-etching condition.

Therefore, in the flexible display apparatus according to an embodiment of the present disclosure, the open portion OP may be formed by etching the glass substrate 110 overlapping the bending area of the flexible display panel on the basis of the over-etching condition or the just-etching condition based on the inner bending structure or the outer bending structure of the flexible display panel. As a result, the flexible display apparatus according to an embodiment of the present disclosure may be manufactured even without a laser release process, and thus, bending reliability and reliability for preventing penetration of water or oxygen may be enhanced. Also, according to the present disclosure, a laser release process of separating the whole glass substrate 110 from the flexible substrate 130, a rear protection film attached on the rear surface of the flexible substrate 130, and an attachment process performed on the rear protection film may be omitted, thereby increasing productivity.

Figure 11:
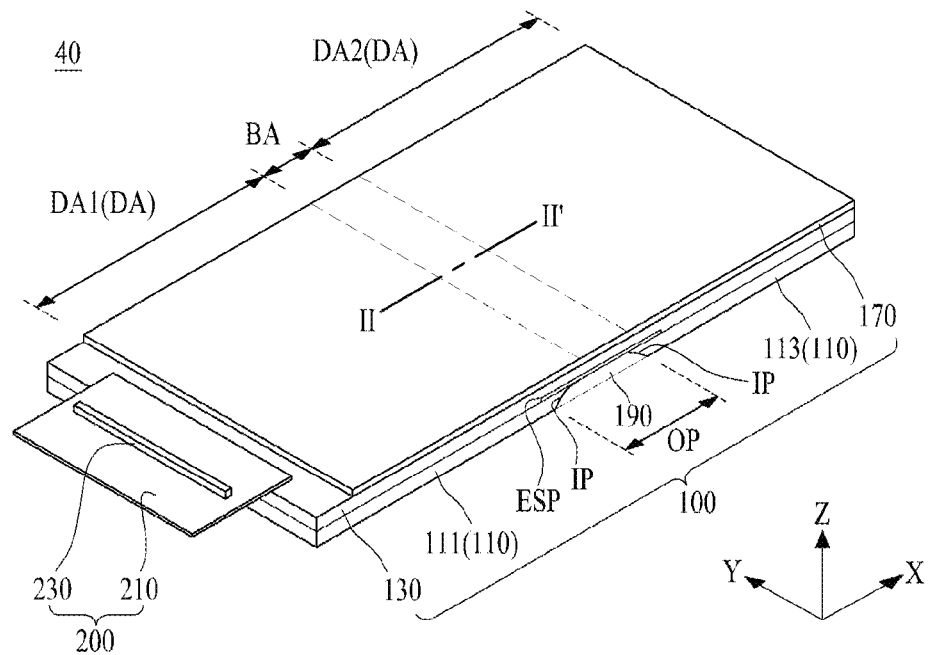
FIG. 11 is a perspective view illustrating a flexible display apparatus according to another embodiment of the present disclosure.
Figure 12:
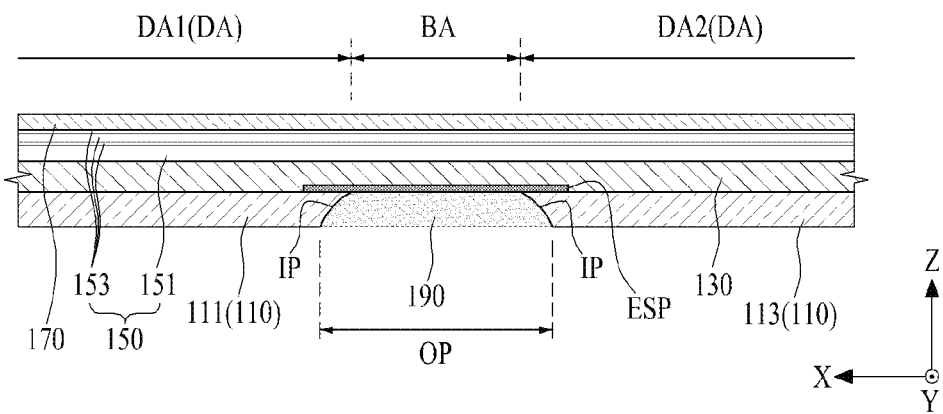
FIG. 12 is a cross-sectional view taken along line II-II' illustrated in FIG. 11.

FIG. 11 is a perspective view illustrating a flexible display apparatus 40 according to another embodiment of the present disclosure, and FIG. 12 is a cross-sectional view taken along line II-II' illustrated in FIG. 11. FIGS. 11 and 12 illustrate an example where an etch stop pattern is additionally provided in the flexible display apparatus illustrated in FIGS. 1 to 7C. Hereinafter, in elements other than an etch stop pattern and elements relevant thereto, like reference numerals refer to like elements, and thus, their repetitive descriptions are omitted.

Referring to FIGS. 11 and 12, the flexible display apparatus 40 according to another embodiment of the present disclosure may further include an etch stop pattern ESP (or an etch barrier pattern or an etch stopper) disposed between a glass substrate 110 overlapping a bending area BA of a flexible display panel 100 and a flexible substrate 130.

The etch stop pattern ESP may be disposed between the glass substrate 110 and the flexible substrate 130 to overlap an open portion OP of the glass substrate 110. For example, the etch stop pattern ESP may have a size which is wider than the open portion OP of the glass substrate 110, or may have a size which is wider than the bending area BA of the flexible display panel 100.

The etch stop pattern ESP according to an embodiment may prevent the flexible substrate 130 from being damaged by an etchant applied to a glass etching process of forming the open portion OP in the glass substrate 110. The etch stop pattern ESP may be formed of a material having a corrosion resistance (or tolerance) against the etchant applied to the glass etching process.

The etch stop pattern ESP according to an embodiment may include one material of Cr, CrOx, Pt, $TiO_2$, and Ni. In this case, the etch stop pattern ESP may be formed on a front surface of the glass substrate 110 by a sputtering process, and then, may be formed as a pattern type on the front surface of the glass substrate 110 overlapping the bending area BA of the flexible display panel 110 through a patterning process. Optionally, the etch stop pattern ESP may be formed as a pattern type on the front surface of the glass substrate 110 overlapping the bending area BA of the flexible display panel 110 through a patterning process using a pattern mask, and in this case, the patterning process may be omitted. The etch stop pattern ESP may be covered by the flexible substrate 130. Optionally, the etch stop pattern ESP according to an embodiment may be disposed between the glass substrate 110 and the flexible substrate 130 so as to be coupled to a whole rear surface of the flexible substrate 130, and in this case, the etch stop pattern ESP may be formed on the front surface of the glass substrate 110 by a sputtering process, and then, may be covered by the flexible substrate 130.

According to another embodiment, the etch stop pattern ESP may include one material of polyethyleneterephthalate (PET), polyethylenenaphthalate (PEN), polyester (PES), polypropylene (PP), and polycarbonate (PC), and for example, may include polyethyleneterephthalate (PET). In this case, the etch stop pattern ESP according to another embodiment may be attached on the front surface of the glass substrate 110 overlapping the bending area BA of the flexible display panel 100 in a pattern type, and then, may be covered by the flexible substrate 130.

The flexible display apparatus 40 according to another embodiment of the present disclosure may include the etch stop pattern ESP disposed between the glass substrate 110 overlapping the bending area BA of the flexible display panel 100 and the flexible substrate 130, and thus, may prevent the flexible substrate 130 from being damaged by the glass etching process of forming the open portion OP in the glass substrate 110.

The etch stop layer ESP of the flexible display apparatus 40 according to another embodiment of the present disclosure may be identically applied to the flexible display apparatus 30 illustrated in FIG. 8. In this case, the flexible display apparatus 30 illustrated in FIG. 8 may further include a plurality of etch stop patterns disposed between the glass substrate 110 and the flexible substrate 130 to overlap each of the plurality of bending areas BA or to overlap each of the plurality of open portions OP provided in the glass substrate 110.

Figure 13:
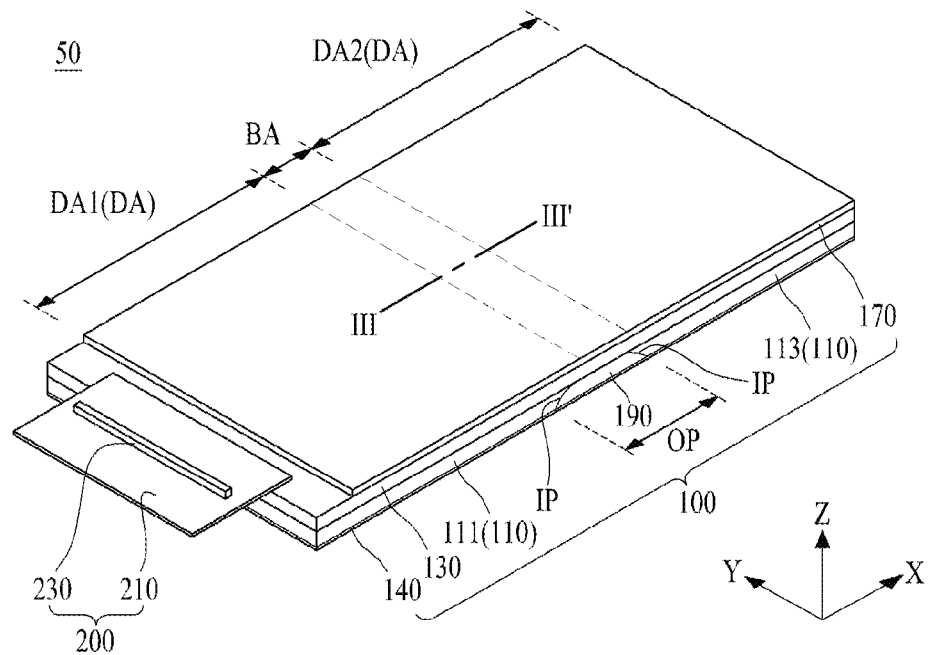
FIG. 13 is a perspective view illustrating a flexible display apparatus according to another embodiment of the present disclosure.
Figure 14:
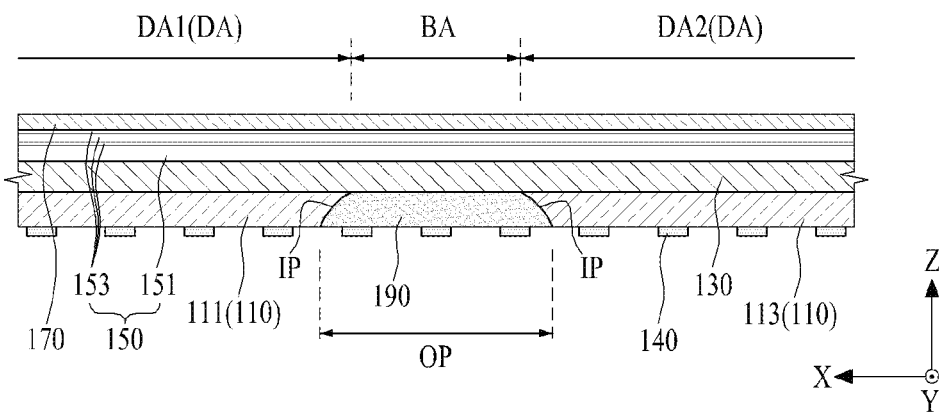
FIG. 14 is a cross-sectional view taken along line III-III' illustrated in FIG. 11.
Figure 15:
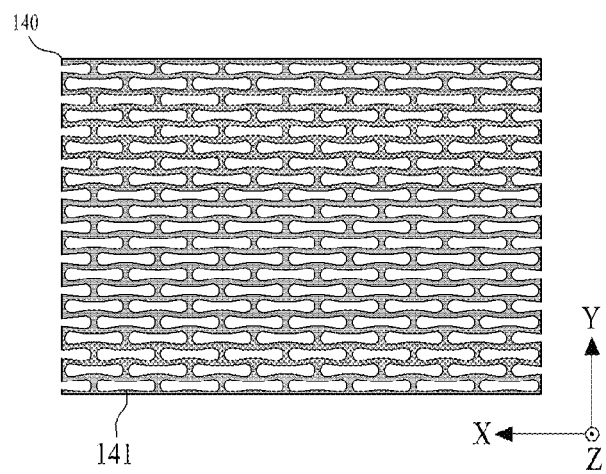
FIG. 15 is a plan view illustrating a pattern frame illustrated in FIG. 13.

FIG. 13 is a perspective view illustrating a flexible display apparatus 50 according to another embodiment of the present disclosure, FIG. 14 is a cross-sectional view taken along line III-III' illustrated in FIG. 11, and FIG. 15 is a plan view illustrating a pattern frame illustrated in FIG. 13. FIGS. 13 to 15 illustrate an example where a pattern frame is additionally provided in the flexible display apparatus illustrated in FIGS. 1 to 9. Hereinafter, in elements other than a pattern frame and elements relevant thereto, like reference numerals refer to like elements, and thus, their repetitive descriptions are omitted.

Referring to FIGS. 13 to 14, the flexible display apparatus 50 according to another embodiment of the present disclosure may further include a pattern frame 140 which covers a rear surface of a flexible display panel 100.

The pattern frame 140 may be coupled to a rear surface of a glass substrate 110 and a filler 190 to cover the rear surface of the flexible display panel 100, and thus, may support the rear surface of the flexible display panel 100, increase a stiffness of the flexible display panel 100 against an external physical impact, and increase a flatness of the flexible display panel 100. Particularly, the pattern frame 140 may support or cover a rear surface of the filler 190 filled into an open portion OP of the glass substrate 110, and thus, may prevent the bending area BA of the flexible display panel 100 from having waviness caused by a step height between the filler 190 and the glass substrate 110.

The pattern frame 140 according to an embodiment may be coupled to the rear surface of the glass substrate 110 and the filler 190 by a frame adhesive member. In this case, the frame adhesive member may be an optically clear adhesive (OCA), an optically clear resin (OCR), or a pressure sensitive adhesive (PSA).

The pattern frame 140 according to an embodiment may include a thin metal plate including a metal material. According to another embodiment, as illustrated in FIG. 15, the pattern frame 140 may include a porous plate or a mesh plate including a plurality of opening patterns 141 having a polygonal shape. For example, the pattern frame 140 may include one material of aluminum (Al), magnesium (Mg), an Al alloy, a Mg alloy, and a Mg-lithium (Li) alloy.

The flexible display apparatus 50 according to another embodiment of the present disclosure may have the same effect as that of the flexible display apparatus illustrated in FIGS. 1 to 9 and may include the pattern frame 140 disposed on the rear surface of the flexible display panel 100, thereby increasing the stiffness and flatness of the flexible display panel 100.

The pattern frame 140 of the flexible display apparatus 50 according to another embodiment of the present disclosure may be identically applied to the flexible display apparatuses 30 and 40 illustrated in FIGS. 8, 11, and 12.

Figure 16:
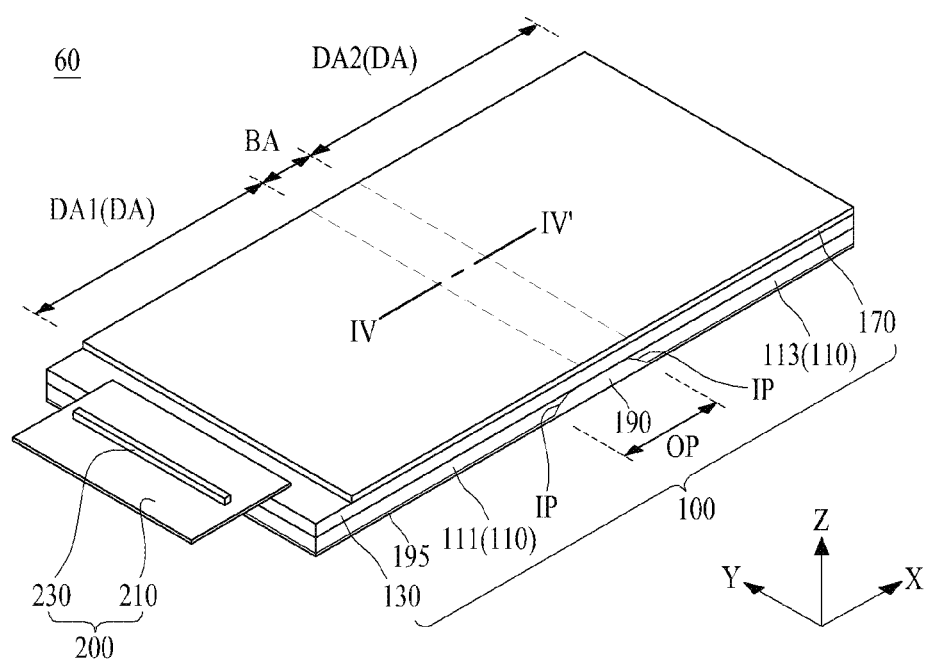
FIG. 16 is a perspective view illustrating a flexible display apparatus according to another embodiment of the present disclosure.
Figure 17:
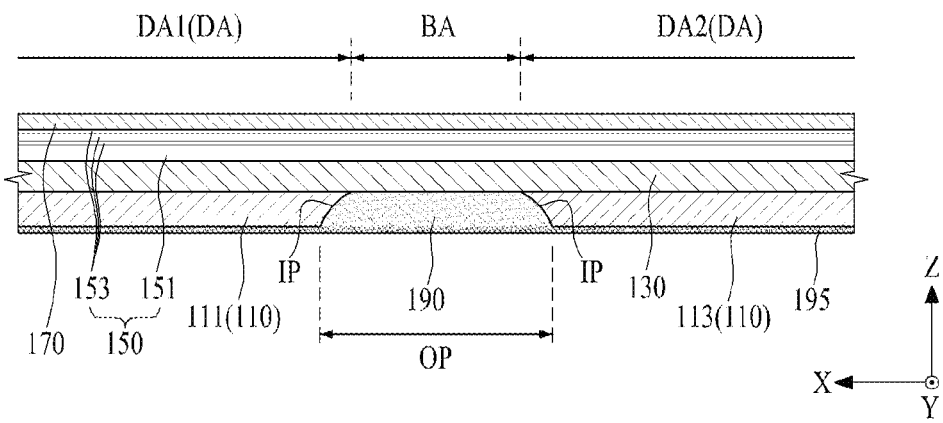
FIG. 17 is a cross-sectional view taken along line IV-IV' illustrated in FIG. 16.

FIG. 16 is a perspective view illustrating a flexible display apparatus 60 according to another embodiment of the present disclosure, and FIG. 17 is a cross-sectional view taken along line IV-IV' illustrated in FIG. 16. FIGS. 16 and 17 illustrate an example where a coating layer is additionally provided in the flexible display apparatus illustrated in FIGS. 1 to 9. Hereinafter, in elements other than a coating layer and elements relevant thereto, like reference numerals refer to like elements, and thus, their repetitive descriptions are omitted.

Referring to FIGS. 16 and 17, the flexible display apparatus 60 according to another embodiment of the present disclosure may further include a coating layer 195 which covers a rear surface of a flexible display panel 100.

The coating layer 195 may be coated on a rear surface of a glass substrate 110 and a rear surface of a filler 190 to cover the rear surface of the flexible display panel 100, and thus, may protect the rear surface of the flexible display panel 100 from an external impact and increase a flatness of the flexible display panel 100. Particularly, the coating layer 195 may support or cover a rear surface of the filler 190 filled into an open portion OP of the glass substrate 110, and thus, may prevent the bending area BA of the flexible display panel 100 from having waviness caused by the filler 190.

Liquid resin (for example, organic resin) may be coated on the rear surface of the filler 190 and the rear surface of the glass substrate 110 through a jetting process or a dispensing process, and then, by curing the liquid resin through a photo-curing process, the coating layer 195 according to an embodiment may be formed to cover the whole rear surface of the flexible display panel 100.

The coating layer 195 according to an embodiment may be formed of the same material as that of the filler 190, and in this case, the filler 190 may be formed of a coating material which is filled (or buried) into the open portion OP of the glass substrate 110 and is cured in a process of forming the coating layer 195. Accordingly, a process of forming the filler 190 in the open portion OP of the glass substrate 110 may be omitted.

The flexible display apparatus 60 according to another embodiment of the present disclosure may have the same effect as that of the flexible display apparatus illustrated in FIGS. 1 to 9 and may include the coating layer 195 covering the whole rear surface of the flexible display panel 100, thereby increasing the stiffness and flatness of the flexible display panel 100.

The coating layer 195 of the flexible display apparatus 60 according to another embodiment of the present disclosure may be identically applied to the flexible display apparatuses 30 and 40 illustrated in FIGS. 8, 11, and 12.

Figure 18:
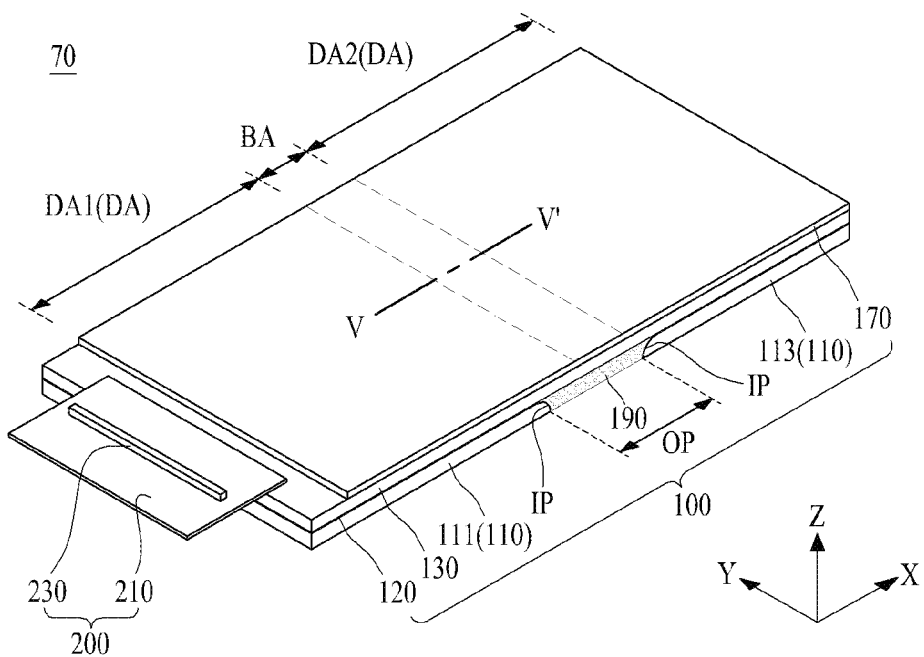
FIG. 18 is a perspective view illustrating a flexible display apparatus according to another embodiment of the present disclosure.
Figure 19:
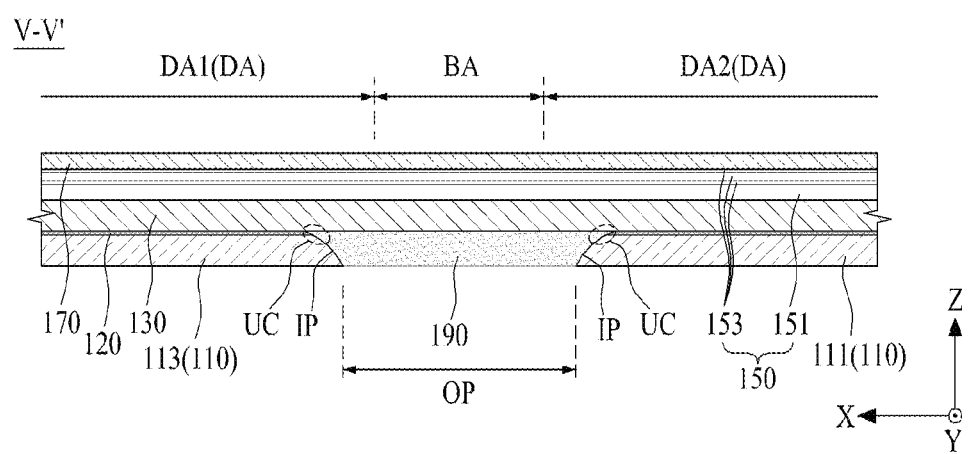
FIG. 19 is a cross-sectional view taken along line V-V' illustrated in FIG. 18.

FIG. 18 is a perspective view illustrating a flexible display apparatus 70 according to another embodiment of the present disclosure, and FIG. 19 is a cross-sectional view taken along line V-V' illustrated in FIG. 18. FIGS. 18 and 19 illustrate an example where an etch sacrificial layer is additionally provided in the flexible display apparatus illustrated in FIGS. 1 to 9. Hereinafter, in elements other than an etch sacrificial layer and elements relevant thereto, like reference numerals refer to like elements, and thus, their repetitive descriptions are omitted.

Referring to FIGS. 18 and 19, the flexible display apparatus 70 according to another embodiment of the present disclosure may further include an etch sacrificial layer 120 disposed between a glass substrate 110 and a flexible substrate 130.

The etch sacrificial layer 120 may be disposed between the glass substrate 110 and the flexible substrate 130 which do not overlap an open portion OP of the glass substrate 110. That is, the etch sacrificial layer 120 may be formed on a whole front surface of the glass substrate 110 and may be disposed in a whole space between the glass substrate 110 and the flexible substrate 130. However, a region of the etch sacrificial layer 120 overlapping the open portion OP of the glass substrate 110 may be removed through etching by a glass etching process of forming the open portion OP of the glass substrate 110, and thus, the other region except the region overlapping the open portion OP of the glass substrate 110 may be disposed between the glass substrate 110 and the flexible substrate 130.

The etch sacrificial layer 120 may be quickly etched by an etchant in the glass etching process of forming the open portion OP of the glass substrate 110, and thus, a glass etch surface of the open portion OP may be provided in a reverse taper structure. In other words, after the open portion OP of the glass substrate 110 is etched in the glass etching process, the etch sacrificial layer 120 may be exposed at the etchant and may be etched more than the glass substrate 110, and thus, an undercut may be quickly formed between a front surface of the glass substrate 110 and a rear surface of the flexible substrate 130. Therefore, the etch sacrificial layer 120 may shorten a process time taken in the glass etching process based on an over-etching condition for forming a glass etch surface of the open portion OP in a reverse taper structure. Accordingly, the etch sacrificial layer 120 may allow the front surface of the glass substrate 110 coupled to the rear surface of the flexible substrate 130 to be more quickly etched than a side surface of the glass substrate 110 in the glass etching process, and thus, may be referred to as an etch acceleration layer.

For example, after the etch sacrificial layer 120 is exposed at the etchant, the etch sacrificial layer 120 may be more quickly etched between the front surface of the glass substrate 110 and the rear surface of the flexible substrate 130 than the glass substrate 110, and thus, may allow the etchant to quickly penetrate into a space between the front surface of the glass substrate 110 and the rear surface of the flexible substrate 130. When the etchant penetrates into the space between the front surface of the glass substrate 110 and the rear surface of the flexible substrate 130, an over-etching speed corresponding to an etch surface of the glass substrate 110 contacting the boundary portion BP between the bending area BA and the display area DA each illustrated in FIG. 5C may increase, and thus, an undercut UC may be quickly formed between the rear surface 130a of the flexible substrate 130 and the inclined surface IP.

The amount of etchant penetrating into a region where the etch sacrificial layer 120 is etched may increase as a thickness of the etch sacrificial layer 120 is thickened, and thus, as a thickness of the etch sacrificial layer 120 is thickened, an undercut UC of the glass etch surface may be more quickly formed. Accordingly, a thickness of the etch sacrificial layer 120 may be set based on a thickness of the glass substrate 110 and a glass etching process time. For example, the etch sacrificial layer 120 may have a thickness of 0.2 or more, but is not limited thereto.

The etch sacrificial layer 120 according to an embodiment may be formed of a material which is easily etched by an etchant applied to the glass etching process. For example, the etch sacrificial layer 120 may include an inorganic material such as silicon oxide (SiOx) or silicon nitride (SiNx), and for example, may include SiOx having a thickness of 0.2 μm or more.

The etch sacrificial layer 120 and the glass substrate 110 exposed at the open portion OP of the glass substrate 110 formed by the glass etching process may be covered by the filler 190 filled into the open portion OP. That is, the filler 190 may be filled up to an undercut UC of the open portion OP and may cover an etch surface of each of the etch sacrificial layer 120 and the glass substrate 110 exposed at the open portion OP of the glass substrate 110

The flexible display apparatus 70 according to another embodiment of the present disclosure may have the same effect as that of the flexible display apparatus illustrated in FIGS. 1 to 9 and may include the etch sacrificial layer 120 disposed between the glass substrate 110 and the flexible substrate 130. Accordingly, the glass etch surface of the open portion OP provided in the glass substrate 110 may have a reverse taper structure, and a process time of the glass etching process based on the over-etching process of forming the open portion OP may be reduced.

Optionally, the flexible display apparatus 70 according to another embodiment of the present disclosure may further include an etch stop layer (or an etch barrier layer) disposed between the flexible substrate 130 and the etch sacrificial layer 120.

The etch stop layer may prevent the flexible substrate 130 from being damaged by an etchant applied to the glass etching process of forming the open portion OP in the glass substrate 110. That is, when the etch sacrificial layer 120 is etched by the etchant, a portion of the flexible substrate 130 overlapping the open portion OP may be exposed at and damaged by the etchant. Accordingly, the etch stop layer may be disposed between the flexible substrate 130 and the etch sacrificial layer 120 to overlap the open portion OP and may prevent the rear surface of the flexible substrate 130 from being exposed at the etchant.

The etch stop layer according to an embodiment, unlike the etch sacrificial layer 120, may be formed of a material having a corrosion resistance (or tolerance) against the etchant applied to the glass etching process. For example, when the glass etching process uses an etchant including an HF-based material, the etch stop layer may include one material of Cr, CrOx, Pt, $TiO_2$, and Ni.

The etch stop layer may be formed to cover the whole rear surface of the flexible substrate 130, or may be formed as a pattern type having a size which is wider than the open portion OP of the glass substrate 110.

The etch sacrificial layer 120 of the flexible display apparatus 70 according to another embodiment of the present disclosure may be identically applied to the flexible display apparatuses 30, 40, 50, and 60 illustrated in FIGS. 8, 11 and 12, and 14 to 17.

Figure 20:
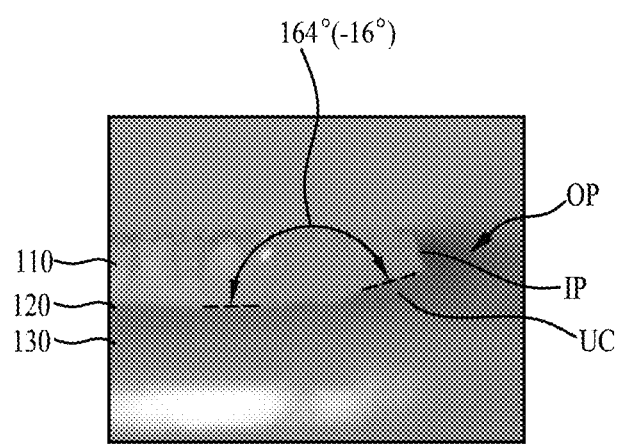
FIG. 20 is a microscope photograph showing a shape of an open portion based on a glass etching process based on an over-etching condition in a flexible display panel according to an experiment example of the present disclosure.

FIG. 20 is a microscope photograph showing a shape of an open portion based on a glass etching process based on an over-etching condition in a flexible display panel according to an experiment example of the present disclosure.

As seen in FIG. 20, as a result obtained when an open portion OP is formed by performing a glass etching process based on the over-etching condition on a glass substrate 110, it may be checked that an angle between an inclined surface IP of the open portion OP and a rear surface of a flexible substrate 130 is measured as 164 degrees (or −16 degrees) and a glass etch surface of the open portion OP has a reverse taper structure including an undercut UC which is large and deep, based on the over-etching condition and the etch sacrificial layer 120. Particularly, it may be checked that the undercut UC of the open portion OP with the etch sacrificial layer 120 applied thereto is larger and deeper than the undercut UC of the open portion OP illustrated in FIGS. 10C and 10D to which the etch sacrificial layer 120 is not applied. Accordingly, when the etch sacrificial layer 120 is provided between the glass substrate 110 and the flexible substrate 130, the glass etch surface of the open portion OP may be formed in the reverse taper structure including the undercut UC which is large and deep.

The flexible display apparatus according to the present disclosure may be applied to a single foldable display apparatus, a multi-foldable display apparatus, a single bendable display apparatus, a multi-bendable display apparatus, or a rollable display apparatus, which includes at least one bending area and is folded or bent according to bending of the bending area.

A flexible display apparatus according to the present disclosure will be described below.

A flexible display apparatus according to an embodiment of the present disclosure may include a flexible substrate including a plurality of display areas and a bending area between the plurality of display areas, a display unit provided in in the plurality of display areas and the bending area of the flexible substrate, a cover film covering the display unit, and a supporting member including a plurality of supporting parts respectively supporting the plurality of display areas and an elastic portion supporting the bending area, wherein the plurality of supporting parts and the elastic portion may include different materials, and a boundary surface between each of the plurality of supporting parts and the elastic portion may have a concave curved shape or a shape inclined at a certain angle.

According to an embodiment of the present disclosure, each of the plurality of supporting parts may include a glass material, and the elastic portion may include an adhesive material.

According to an embodiment of the present disclosure, each of the plurality of supporting parts may be directly coupled to a rear surface of the flexible substrate.

According to an embodiment of the present disclosure, the elastic portion may have a concave or convex cross-sectional shape.

According to an embodiment of the present disclosure, the elastic portion may further include a concave groove portion, and a center portion of the concave groove portion may overlap a center portion of the bending area.

According to an embodiment of the present disclosure, the flexible substrate may be folded in a direction in which the plurality of supporting parts face each other.

A flexible display apparatus according to an embodiment of the present disclosure may include a flexible substrate including a plurality of display areas and a bending area between the plurality of display areas, a display unit provided in in the plurality of display areas and the bending area of the flexible substrate, a cover film covering the display unit, and a glass substrate including an open portion disposed on a rear surface of the flexible substrate to overlap the bending area, wherein the open portion may include an inclined surface having a curved shape.

According to an embodiment of the present disclosure, the glass substrate may further include a plurality of supporting parts supporting the rear surface of the flexible substrate overlapping each of the plurality of display areas and each including the inclined surface facing the open portion, and the open portion may be provided between the plurality of supporting parts.

According to an embodiment of the present disclosure, the inclined surface may have a concave curved shape.

According to an embodiment of the present disclosure, a cross-sectional area of the open portion parallel to the rear surface of the flexible substrate may increase in a direction distancing from the rear surface of the flexible substrate.

According to an embodiment of the present disclosure, an angle between the rear surface of the flexible substrate and the boundary surface may be an acute angle.

According to an embodiment of the present disclosure, an angle between the rear surface of the flexible substrate and the boundary surface may be within a range of 15 degrees to 70 degrees.

According to an embodiment of the present disclosure, the open portion may include an undercut between the rear surface of the flexible substrate and the boundary surface.

According to an embodiment of the present disclosure, an angle between the rear surface of the flexible substrate and the boundary surface may be an obtuse angle.

According to an embodiment of the present disclosure, the flexible display apparatus may further include a filler filled into the open portion.

According to an embodiment of the present disclosure, the filler may have a concave or convex cross-sectional shape.

According to an embodiment of the present disclosure, the filler may further include a concave groove portion, and a center portion of the concave groove portion may overlap a center portion of the bending area.

According to an embodiment of the present disclosure, the flexible substrate may be folded in a direction in which the plurality of display areas face each other.

According to an embodiment of the present disclosure, the flexible display apparatus may further include an etch stop pattern disposed between the filler and the flexible substrate.

According to an embodiment of the present disclosure, the flexible display apparatus may further include a coating layer covering a rear surface of the glass substrate and a rear surface of the filler.

According to an embodiment of the present disclosure, the coating layer may include the same material as a material of the filler.

According to an embodiment of the present disclosure, the flexible display apparatus may further include a pattern frame coupled to a rear surface of the glass substrate and a rear surface of the filler.

According to an embodiment of the present disclosure, the pattern frame may include a porous plate or a mesh plate including a plurality of opening portions.

According to an embodiment of the present disclosure, the flexible display apparatus may further include an etch sacrificial layer disposed between the flexible substrate and a region, other than a region overlapping the open portion of the glass substrate, of the glass substrate.

According to an embodiment of the present disclosure, the etch sacrificial layer may include silicon oxide (SiOx) or silicon nitride (SiNx).

According to an embodiment of the present disclosure, the open portion may include an undercut between the rear surface of the flexible substrate and the boundary surface.

According to an embodiment of the present disclosure, the flexible display apparatus may further include a filler filled into the open portion, wherein the filler may cover an etch surface of the etch sacrificial layer and the glass substrate exposed at the open portion.

According to an embodiment of the present disclosure, the flexible display apparatus may further include an etch stop layer disposed between the flexible substrate and the etch sacrificial layer to overlap the open portion of the glass substrate.

According to an embodiment of the present disclosure, the glass substrate may have a thickness of 0.01 mm to 1.0 mm.

According to an embodiment of the present disclosure, the flexible substrate may be wound in a spiral shape.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the flexible display apparatus of the present disclosure without departing from the spirit or scope of the disclosure. Thus, it is intended that the present disclosure covers the modifications and variations of this disclosure provided they come within the scope of the appended claims and their equivalents.

What is claimed is:

1. A flexible display apparatus, comprising:
   a supporting member;
   a flexible substrate on the supporting member, and including a plurality of display areas and a bending area between the plurality of display areas;
   a display unit provided in the plurality of display areas and the bending area of the flexible substrate;
   a cover film covering the display unit; and
   a filler filled into an open portion where a portion of the supporting member has been removed under the bending area such that the filler directly contacts a rear surface of the flexible substrate and is absent on a rear surface of the supporting member,
   wherein a maximum height of the open portion is the same as the thickness of the support member, and
   wherein a thickness of the filler from a surface of the filler to the rear surface of the flexible substrate at the center of the open portion less than the thickness of the supporting member.

2. The flexible display apparatus of claim 1, wherein
   the supporting member comprises a glass material, and
   the filler comprises an adhesive material.

3. The flexible display apparatus of claim 2, wherein
   the supporting member includes a plurality of supporting parts respectively supporting the plurality of display areas and an elastic portion supporting the bending area,
   the elastic portion comprises the filler, and
   each of the plurality of supporting parts and the filler are directly coupled to the rear surface of the flexible substrate.

4. The flexible display apparatus of claim 3, wherein the elastic portion has a concave or convex cross-sectional shape.

5. The flexible display apparatus of claim 2, wherein
   the open portion is formed by a glass etching process using an etchant, and
   the open portion comprises an inclined surface having a curved shape by the glass etching process.

6. The flexible display apparatus of claim 1, wherein
   the filler further comprises a concave groove portion, and
   a center portion of the concave groove portion overlaps a center portion of the bending area.

7. The flexible display apparatus of claim 1, wherein the flexible substrate is folded in a direction in which the plurality of display areas face each other.

8. The flexible display apparatus of claim 1, wherein the flexible substrate is wound in a spiral shape.

9. The flexible display apparatus of claim 1, wherein the open portion includes an inclined surface of a concave curved shape at a boundary between the display area and the bending area.

10. A flexible display apparatus, comprising:
    a glass substrate;
    a flexible substrate on the glass substrate, and including a plurality of display areas and a bending area between the plurality of display areas;
    a display unit provided in the plurality of display areas and the bending area of the flexible substrate;
    a cover film covering the display unit; and
    a filler filled into an open portion where a portion of the glass substrate has been removed under the bending area such that the filler directly contacts a rear surface of the flexible substrate and is absent on a rear surface of the glass substrate,
    wherein a maximum height of the open portion is the same as the thickness of the glass substrate, and wherein a thickness of the filler from a surface of the filler to the rear surface of the flexible substrate at the center of the open portion less than the thickness of the glass substrate.

11. The flexible display apparatus of claim 10, wherein the glass substrate further comprises a plurality of supporting parts supporting the rear surface of the flexible substrate overlapping each of the plurality of display areas, and the open portion is provided between the plurality of supporting parts and includes an inclined surface having a curved shape.

12. The flexible display apparatus of claim 11, wherein the inclined surface has a concave curved shape.

13. The flexible display apparatus of claim 11, wherein a cross-sectional area of the open portion parallel to the rear surface of the flexible substrate increases in a direction distancing from the rear surface of the flexible substrate.

14. The flexible display apparatus of claim 11, wherein an angle between the rear surface of the flexible substrate and the inclined surface is an acute angle.

15. The flexible display apparatus of claim 11, wherein an angle between the rear surface of the flexible substrate and the inclined surface is within a range of 15 degrees to 70 degrees.

16. The flexible display apparatus of claim 11, wherein the open portion comprises an undercut between the rear surface of the flexible substrate and the inclined surface.

17. The flexible display apparatus of claim 11, wherein an angle between the rear surface of the flexible substrate and the inclined surface is an obtuse angle.

18. The flexible display apparatus of claim 10, wherein the filler has a concave or convex cross-sectional shape.

19. The flexible display apparatus of claim 18, wherein
the filler further comprises a concave groove portion, and
a center portion of the concave groove portion overlaps a center portion of the bending area.

20. The flexible display apparatus of claim 10, wherein the flexible substrate is folded in a direction in which the plurality of display areas face each other.

21. The flexible display apparatus claim 10, wherein the glass substrate has a thickness of 0.01 mm to 1.0 mm.

22. The flexible display apparatus of claim 10, wherein
the open portion is formed by a glass etching process using an etchant, and
the open portion comprises an inclined surface having a curved shape by the glass etching process.

23. The flexible display apparatus of claim 10, wherein the open portion includes an inclined surface of a concave curved shape at a boundary between the display area and the bending area.

* * * * *